United States Patent
Takeda et al.

(10) Patent No.: US 8,364,827 B2
(45) Date of Patent: Jan. 29, 2013

(54) COMMUNICATION SYSTEM

(75) Inventors: Yukiko Takeda, Tokorozawa (JP); Akihiko Takase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 12/396,499

(22) Filed: Mar. 3, 2009

(65) Prior Publication Data

US 2009/0300189 A1 Dec. 3, 2009

(30) Foreign Application Priority Data

Jun. 3, 2008 (JP) .................. 2008-145830

(51) Int. Cl.
  *G06F 15/16* (2006.01)
(52) U.S. Cl. ......... 709/227; 709/203; 709/204; 709/228
(58) Field of Classification Search ........... 709/227–229
See application file for complete search history.

(56) References Cited

U.S. PATENT DOCUMENTS

| | | |
|---|---|---|
| 2002/0076025 A1 | 6/2002 | Liversidge et al. |
| 2004/0107360 A1 | 6/2004 | Herrmann et al. |
| 2005/0021777 A1* | 1/2005 | Nakao et al. .......... 709/228 |
| 2006/0026286 A1* | 2/2006 | Lei et al. .............. 709/227 |
| 2006/0224717 A1 | 10/2006 | Sawai et al. |
| 2008/0120125 A1 | 5/2008 | Chavez |
| 2008/0120164 A1 | 5/2008 | Hassler |

FOREIGN PATENT DOCUMENTS

| | | |
|---|---|---|
| GB | 2 443 962 A | 5/2008 |
| JP | 2006-325038 | 11/2006 |
| JP | 2007-295246 | 11/2007 |
| JP | 2008-042648 | 2/2008 |

OTHER PUBLICATIONS

5th Draft ES 202 504-2 Parlay X 3.0, Part 2: Third Party Call, URL: http://portal.etsi.org/docbox/TISPAN/Open/SA/ParlayX/ES_202_504_ParlayX_3.0/lates/es_20250402v005.zip.
IETF RFC3261, SIP: Session Initiation Protocol § 4, URL: http://www.apps.ietf.org/rfc/rfc3261.html.
JP Office Action in JP Application No. 2008-145830, dated Sep. 25, 2012.

* cited by examiner

*Primary Examiner* — Ashok Patel
*Assistant Examiner* — Evans Desrosiers
(74) *Attorney, Agent, or Firm* — Mattingly & Malur, PC

(57) ABSTRACT

A cooperating system includes a web server and a communication service control server, where information of an error in a communication network is not notified until the web server makes an inquiry to the communication service control server. To solve this problem, a communication system is configured to include a session control server for controlling communication sessions from/to a plurality of terminals, an application server for communicating with the session control server, a web server for communicating with the application server, and a network for coupling the session control server, the application server and the web server. The application server is configured to transmit status related information including information on each communication session status of the plurality of terminals to the web server. The web server is configured to detect each communication session status of the plurality of terminals based on the received status related information.

7 Claims, 23 Drawing Sheets

230 SESSION INFORMATION TABLE (WEB SERVER)

| Parlay X Call Session Identifier (231) | SIP AS IP address (234) | 3PCC IDENTIFIER (235) | TIMER (237) | |
|---|---|---|---|---|
| 1234 | Sip-as-ip | Xx | 300 | 230-1 |
|  |  |  |  | 230-2 |
| ⋮ | ⋮ | ⋮ | ⋮ |  |
|  |  |  |  | 230-n |

FIG. 3

210 SESSION INFORMATION TABLE (SIP APPLICATION SERVER)

| 211 Parlay X call Session Identifier | 212 WEB SERVER IP adress | 213 3PCC IDENTIFIER | 214 TIMER T1 | 215 TIMER T2 | 216 STATUS | 217 TIMER T3 | |
|---|---|---|---|---|---|---|---|
| 1234 | Web-ip | Xx | 300 | 300 | BUSY | 300 | 210-1 |
|  |  |  |  |  |  |  | 210-2 |
| ⋮ | ⋮ | ⋮ | ⋮ | ⋮ | ⋮ | ⋮ |  |
|  |  |  |  |  |  |  | 210-n |

*FIG. 5*

270 SESSION STATUS MANAGEMENT TABLE (SIP SERVER)

| To header | From header | Call id | TIMER T | STATUS |
|---|---|---|---|---|
| 1234 | Web-ip | Xx | 300 | BUSY |
|  |  |  |  |  |
| ⋮ | ⋮ | ⋮ | ⋮ | ⋮ |
|  |  |  |  |  |

271, 272, 273, 274, 275 (column labels)
270-1, 270-2, 270-n (row labels)

*FIG. 7*

210 SESSION INFORMATION TABLE (SIP APPLICATION SERVER)

| 211 Parlay X call Session Identifier | 212 WEB SERVER IP adress | 213 3PCC IDENTIFIER | 214 TIMER T1 | 215 TIMER T2 | 216 STATUS | 218 MONITOR | |
|---|---|---|---|---|---|---|---|
| 1234 | Web-ip | Xx | 300 | 300 | BUSY | ON | 210-1 |
|  |  |  |  |  |  |  | 210-2 |
| ⋮ | ⋮ | ⋮ | ⋮ | ⋮ | ⋮ | ⋮ |  |
|  |  |  |  |  |  |  | 210-n |

FIG. 14

280 WATCHER INFORMATION TABLE (PRESENCE SERVER)

| 281 PRESENTITY | 282 WATCHER | 283 STATUS | |
|---|---|---|---|
| ue7a | Web-ip | BUSY | 280-1 |
| | | | 280-2 |
| ⋮ | ⋮ | ⋮ | |
| | | | 280-n |

FIG. 19

COMMUNICATION SYSTEM

CLAIM OF PRIORITY

The present application claims priority from Japanese patent application JP 2008-145830 filed on Jun. 3, 2008 the content of which is hereby incorporated by reference into this application.

BACKGROUND OF THE INVENTION

This invention relates to a communication system, and more particularly, to a communication system in which SIP session control is used.

The third generation mobile network system aims to provide various multimedia services of high quality and high speed. The multimedia services include voice, data, video and the like. The 3rd Generation Partnership Project (3GPP) has been promoting standardization of an "All IP based mobile communication network" to provide a multimedia service using an internet protocol (IP) technique on a packet switching network.

A session control system in the All IP based mobile communication network is called an IP multimedia subsystem (IMS). The IMS has been used in the session control technique in the next generation network (NGN).

A session initiation protocol (SIP) is used as a session control protocol (For example, see IETF RFC3261, "SIP: Session Initiation Protocol §4"). The SIP is a protocol for performing session control of the IP multimedia communication specified for internet engineering task force (IETF).

A voice over IP (VoIP) is a representative service using the SIP. The VoIP is a technique which transmits/receives voice information on the IP network. The VoIP communication using the SIP requires a setting of a virtual speech path (a session) between communication devices which transmit/receive voice information. Voice data which is IP packetized is transferred through the set virtual speech path. In the VoIP communication, the SIP controls initiation, maintaining and termination of sessions between the communication devices.

Media information such as attributes of the voice data is determined at the session initiation. The media information is notified using a session description protocol (SDP) included in a SIP message. The SDP describes various pieces of session information (an IP address, a port number, a media type, for example).

Further, an application programming interface (API) is being considered for being able to use a communication service provided by a provider from a Web service provided by a third party.

The Parlay Group is a group that specifies an open API which does not depend on a network or a vendor. The Parlay Group is planning to use "Parlay-X" as the open API. "Parlay-X" specifies APIs for the purposes of the usage in a Web service environment, and the Web service of which usage is not limited to an implemented language. The "Parlay-X" provides Web developers with abstracted communication APIs.

The APIs specified in the "Parlay-X" include, for example, 3rd party call control (3PCC) which provides a two-party speech service by initiating from a Web application side. (For example, see 5th Draft ES 202 504-2 Parlay X 3.0, "Part 2: Third Party Call", [online], August 2007).

The Parlay Group cooperates with the European telecommunications standard institute (ETSI) and the $3^{rd}$ generation partnership project (3GPP). The "Parlay-X" is published by the three groups and defines a standard open interface; however, how the "Parlay-X" is implemented is not specified.

SUMMARY OF THE INVENTION

In the "Parlay-X", usage of APIs for each service is specified. A request message (including session initiation, session termination and call information query) to a communication system from a Web application server and a response to the message are specified for the APIs to be used for the 3PCC.

However, ways for implementation such as transmitting intervals for the request message and the response message are not specified. Accordingly, in a case where the communication is terminated while the 3PCC service is provided, a way to notify that a server which provides with the Web application terminates the communication from the communication system is needed. For example, although when the communication is terminated, the termination cannot be notified to the communication system to the Web server. Thus, even though the communication is terminated, communication network resources are consumed more than necessary or billing mistakes occur because the Web server cannot detect the termination of the communication.

The object of this invention is to provide a method for a Web server to detect termination of communication sessions.

A representative aspect of this invention is as follows. That is, there is provided a communication system comprising: a session control server for controlling communication sessions from/to a plurality of terminals, an application server for communicating with the session control server, a Web server for communicating with the application server, and a network for coupling the session control server, the application server and the Web server. The application server is configured to transmit status related information including information on each communication session status of the plurality of terminals to the Web server. The Web server is configured to detect each communication session status of the plurality of terminals based on the received status related information.

According to an embodiment of this invention, a Web server is able to detect termination of communication sessions on a communication system side.

BRIEF DESCRIPTION OF THE DRAWINGS

The present invention can be appreciated by the description which follows in conjunction with the following figures, wherein:

FIG. 3 is an explanation diagram for showing a configuration example of a session information table in the Web server according to the first embodiment of this invention;

FIG. 5 is an explanation diagram for showing a configuration example of a session information table in the SIP application server according to the first embodiment of this invention;

FIG. 7 is an explanation diagram for showing a configuration example of a session status management table in the SIP server according to the first embodiment of this invention;

FIG. 14 is an explanation diagram for showing a configuration example of a session information table in the SIP application server according to the second embodiment of this invention;

FIG. 19 is an explanation diagram for showing a configuration example of a watcher information table in the presence server according to the third embodiment of this invention;

DETAILED DESCRIPTION OF THE PREFERRED EMBODIMENTS

A first embodiment of this invention is described with reference to the drawings.

As a representative example, a detailed description of a communication method using 3rd party call control (3PCC) is given.

Figure 1:
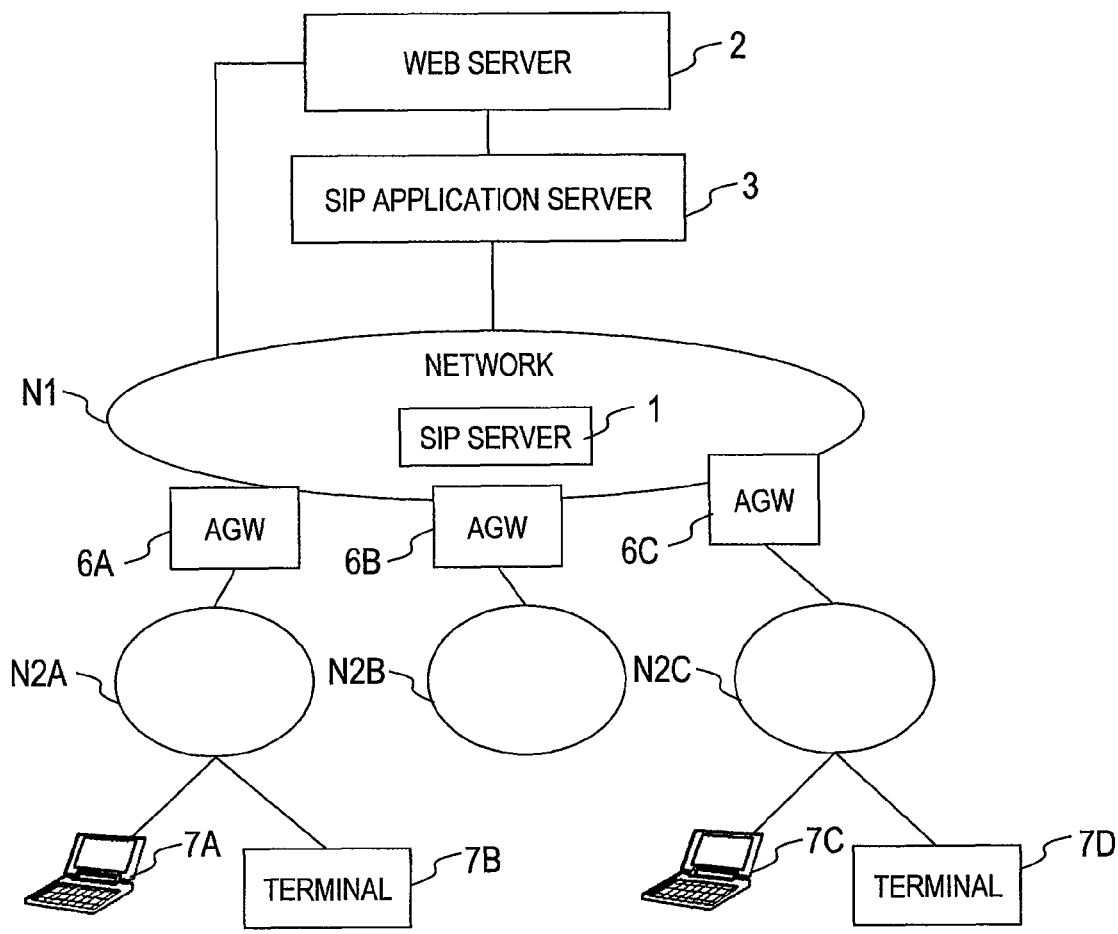
FIG. 1 is a configuration diagram of a communication network according to a first embodiment of this invention.

FIG. 1 is a configuration diagram of a communication network according to the first embodiment of this invention.

A network according to this embodiment includes IP network N1 and access networks N2A, N2B and N2C (access network N2).

FIG. 1 shows fixed terminals 7A to 7D as an example for terminals 7 which are user equipment (UE). Hereinafter, when the terminals 7 are separately described, an additional character, "A", "B", "C" or "D" is added to the numerical reference. Each of the terminals 7 are described as, for example, a "terminal 7A" and a "terminal 7B". Other elements are described in the similar way.

The IP network N1 and the access network N2 are connected via access gateway apparatuses (AGWs) 6 (6A, 6B and 6C). The IP network N1 and the access network N2 may be connected by other communication apparatuses such as a router, instead of the AGWs 6. Each AGW 6 transfers IP packets transmitted/received between the terminals 7 and the IP network N1. The IP network N1 at least comprises one SIP server 1.

A Web server 2 comprises a user interface function for initiating a 3PCC service, a function necessary for initiating the 3PCC service and a mutual communication function between the Web server 2 and a SIP application server 3.

The SIP application server 3 comprises a function for controlling execution of an IMS application (a SIP application).

Note that FIG. 1 shows one SIP server 1, one Web server 2, and one SIP application server 3 as an example. However, a plurality of these servers may be installed in the communication network in a case where this invention is implemented.

Figure 2:
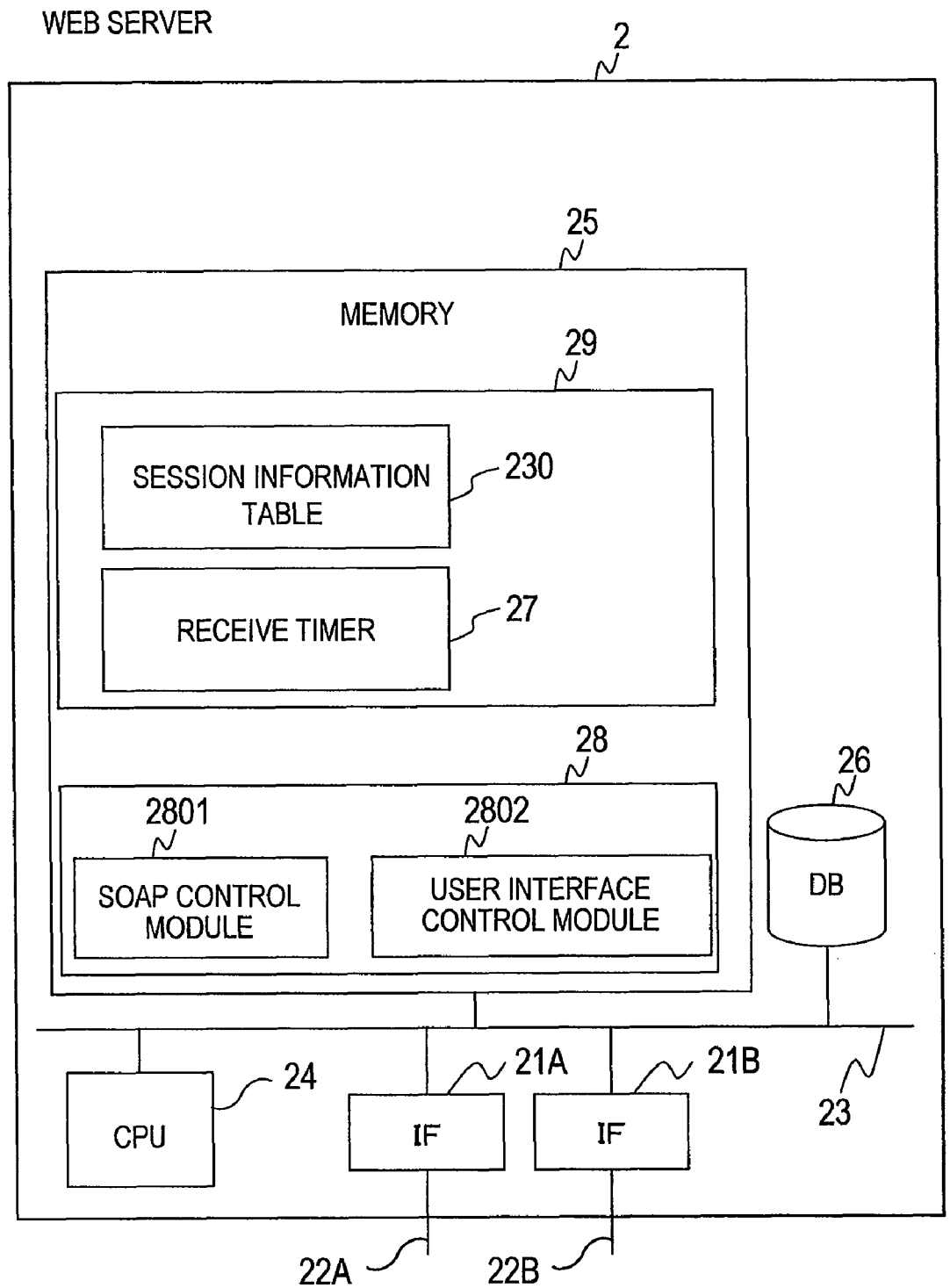
FIG. 2 is a block diagram for showing a configuration example of a Web server according to the first embodiment of this invention.

FIG. 2 is a block diagram for showing a configuration example of a Web server according to the first embodiment of this invention.

The Web server 2 comprises interfaces (IFs) 21 (21A and 21B) which accommodate lines 22 (22A and 22B), a CPU 24, a memory 25 and a database (DB) 26. Each element is connected by a bus 23.

The memory 25 stores a program 28 which executes protocol processing and a program 29 which executes the mutual connection function between the Web server 2 and the SIP application server 3. Note that the memory 25 may store IMS further additional programs.

The CPU 24 is a processor which executes the programs stored in the memory 25. In descriptions hereinafter, the processes the Web server 2 execute are actually performed by the CPU 24 by executing any one of the programs stored in the memory 25.

The program 28 which executes the protocol processing includes a program (SOAP control module 2801) and a program (user interface control module 2802). The SOAP control module 2801 provides a function to transmit/receive signals between the Web server 2 and the SIP application server 3. The user interface control module 2802 provides a function to transmit/receive signals between the terminals 7 and the Web server 2.

The program 29 which executes the mutual connection function includes a processing program 27 which performs timer reception and a session information table 230 in which information for each session is stored. Note that the database 26 may include the session information table 230.

The Web server 2 includes the timer reception processing program 27 and the session information table 230. Accordingly, the Web server 2 can control a transmission period of a call information query request by using a time value received from the SIP application server 3. Details will be described later with reference to FIGS. 8 to 11.

FIG. 3 is an explanation diagram for showing a configuration example of the session information table 230 in the Web server 2 according to the first embodiment of this invention.

In a case where the Web server 2 receives a message transmitted from the SIP application server 3, the Web server 2 checks the session information table 230 and updates the session information table 230 based on information included in the message.

The session information table 230 at least includes a Parlay-X call session identifier 231, a SIP AS IP address 234, a 3PCC identifier 235, and a timer 237.

The Parlay-X call session identifier 231 holds an identifier for uniquely identifying the communication session between the Web server 2 and the SIP application server 3. This Parlay-X call session identifier 231 is the same one as a Parlay-X call session identifier 211 in FIG. 5 which will be described later.

The SIP AS IP address 234 holds an identifier for identifying the SIP application server 3 corresponding to the Parlay-X call Session Identifier 231.

The 3PCC identifier 235 holds an identifier for identifying a communication session (between the SIP application server 3 and the terminals 7) connected through the 3PCC service provided by the SIP application server 3. This is the same one as the 3PCC identifier which will be described with reference to FIG. 5 later.

The timer 237 holds a transmission period (a timer value) of a call information query request that the Web server 2 transmits to the SIP application server 3.

The session information table 230 includes the timer value 237. Accordingly, the Web server 2 can quickly detect termination of the communication session or the end of the communication between terminals.

Figure 4:
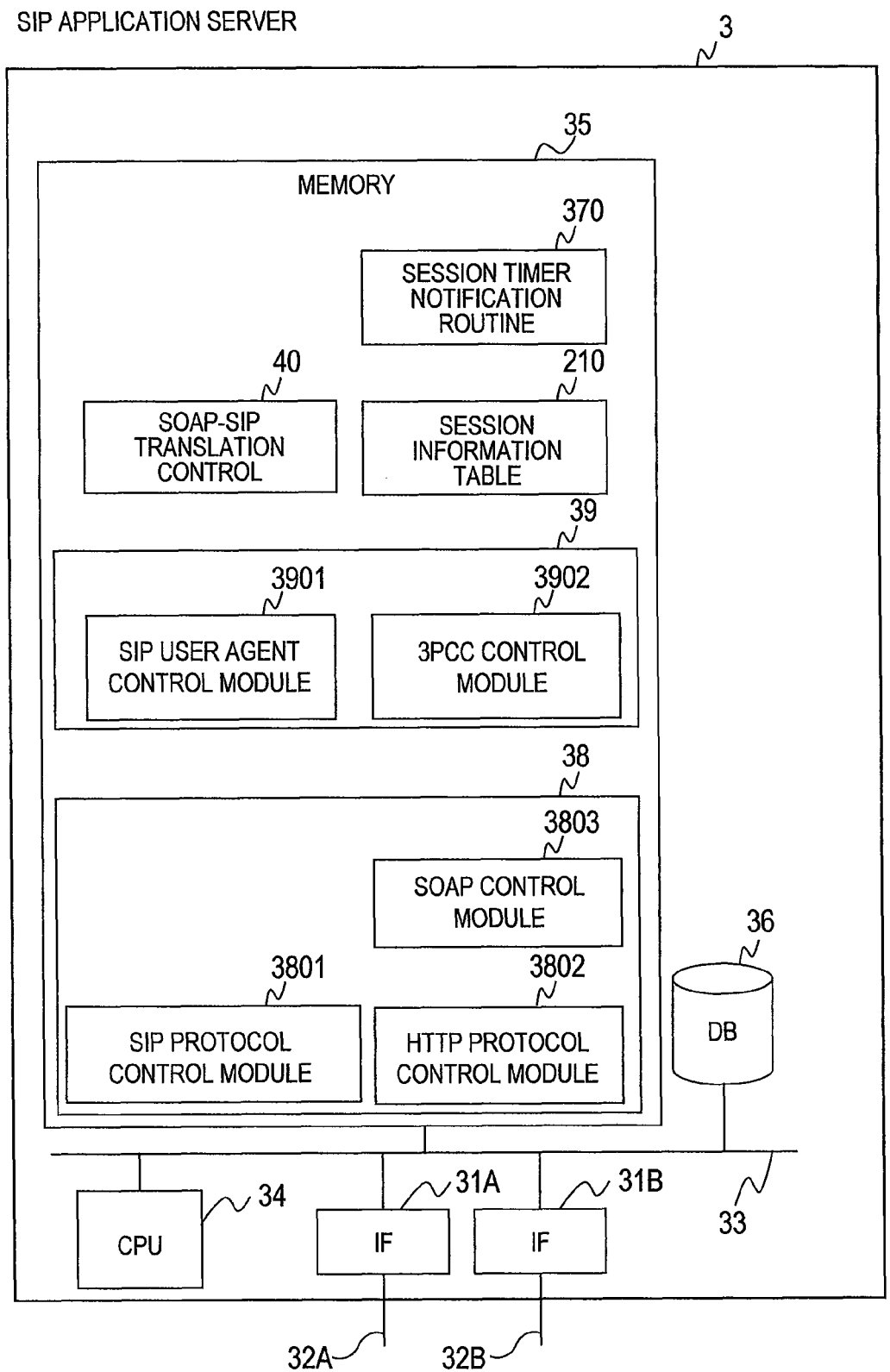
FIG. 4 is a block diagram for showing a configuration example of a SIP application server according to the first embodiment of this invention.

FIG. 4 is a block diagram for showing a configuration example of a SIP application server 3 according to the first embodiment of this invention.

The SIP application server 3 comprises interfaces (IFs) 31 (31A and 31B) which accommodate lines 32 (32A and 32B), a CPU 34, a memory 35 and a database (DB) 36. Each element is connected by a bus 33.

The memory 35 stores a program 38 (SIP protocol control module 3801, HTTP protocol control module 3802, and SOAP control module 3803) which executes protocol processing, a program 39 (a SIP user agent control processing module 3901, 3PCC control processing module 3902) which executes processing to achieve the 3PCC server, a program (a session timer notification routine 370) which executes timer notification processing, a session information table 210 in which information for each session is stored, and a processing program 40 which performs protocol translation (SOAP-SIP). Note that the memory 35 may store further additional programs.

The CPU 34 is a processor which executes the programs stored in the memory 35. In descriptions hereinafter, the processes executed by the SIP application server 3 are actually performed by the CPU 34 by executing any one of the programs stored in the memory 35.

The program 38 which executes protocol processing includes a program (the SIP protocol control module 3801) for providing a function for transmitting/receiving signals between the SIP application server 3 and the SIP server 1, and a program (the HTTP protocol control 3802, and the SOAP control module 3803) for providing a function for transmitting/receiving signals between the SIP application server 3 and the Web server 2.

The program 39 which executes processing to providing the 3PCC server includes the program 3901 which performs the SIP user agent processing and the program 3902 which performs 3PCC control.

The program 3902 which performs 3PCC control is a program for controlling communication between more than two terminals. For example, the program 3902 holds association information of the communication session between the terminal 7A and the SIP application server 3, and the communication session between the terminal 7B and the SIP application server 3 in order to make possible communication between the terminal 7A and the terminal 7B through the 3PCC control processing. Furthermore, the session timer notification routine 370, the session information table 210 used for storing the information on the each session and the processing program which performs the protocol translation (SOAP-SIP) are included. Note that the database 36 may include the session information table 210.

The SIP application server 3 includes the session timer notification routine 370 and the session information table 210. Accordingly, the SIP application server 3 can notify the Web server 2 of the transmission period (a timer value) of the call information query request.

FIG. 5 is an explanation diagram for showing a configuration example of a session information table 210 in the SIP application server 3 according to the first embodiment of this invention.

In a case where the SIP application server 3 receives a message transmitted from the SIP server 1, the SIP application server 3 checks the session information table 210 and updates the session information table 210 based on information included in the message.

The session information table 210 at least includes a Parlay-X call Session Identifier 211, a Web server IP address 212, a 3PCC identifier 213, a timer T1 214, a timer T2 215, status 216 and a timer T3 217.

The Parlay-X call session identifier 211 holds an identifier for uniquely identifying the communication session between the Web server 2 and the SIP application server 3. The identifier is generated when the SIP application server 3 receives a request for a SIP session initiation from the Web server 2 and the identifier is held in the Parlay-X call Session Identifier 211. The detail will be described later with reference to FIG. 8.

The Web server IP address 212 holds an identifier for identifying the Web server 2 corresponding to the Parlay-X call Session Identifier 211.

The 3PCC identifier 213 holds an identifier for identifying a communication session (between the SIP application server 3 and the terminals 7) connected through the 3PCC service provided by the SIP application server 3. The identifier is generated when the SIP application server 3 initiates a SIP session and is held in the 3PCC identifier 213. The detail will be described later with reference to FIG. 8.

The timer T1 214 and the timer T2 215 hold transmission periods (timer values) of messages inquiring about communication session status to each terminal. Note that although two-party communication is assumed in this embodiment, the number of timers increases according to the number of connected communication terminals in a case where more than two parties are communicating.

The status 216 holds communication session status. Note that the status includes session initiating, busy, terminating, participating in a three-party communications and logging out.

The timer T3 217 holds a transmission period (a timer value) of the call information query request that the Web server 2 transmits to the SIP application server 3. The timer T3 217 is obtained by a method (see FIG. 10) which will be described later and held in the session information table 210.

The session information table 210 includes the timer T3 217. Accordingly, the SIP application server 3 can notify the Web server 2 of the transmission period of the call information query request. Thus, the Web server 2 can quickly detect termination of the communication session.

Figure 6:
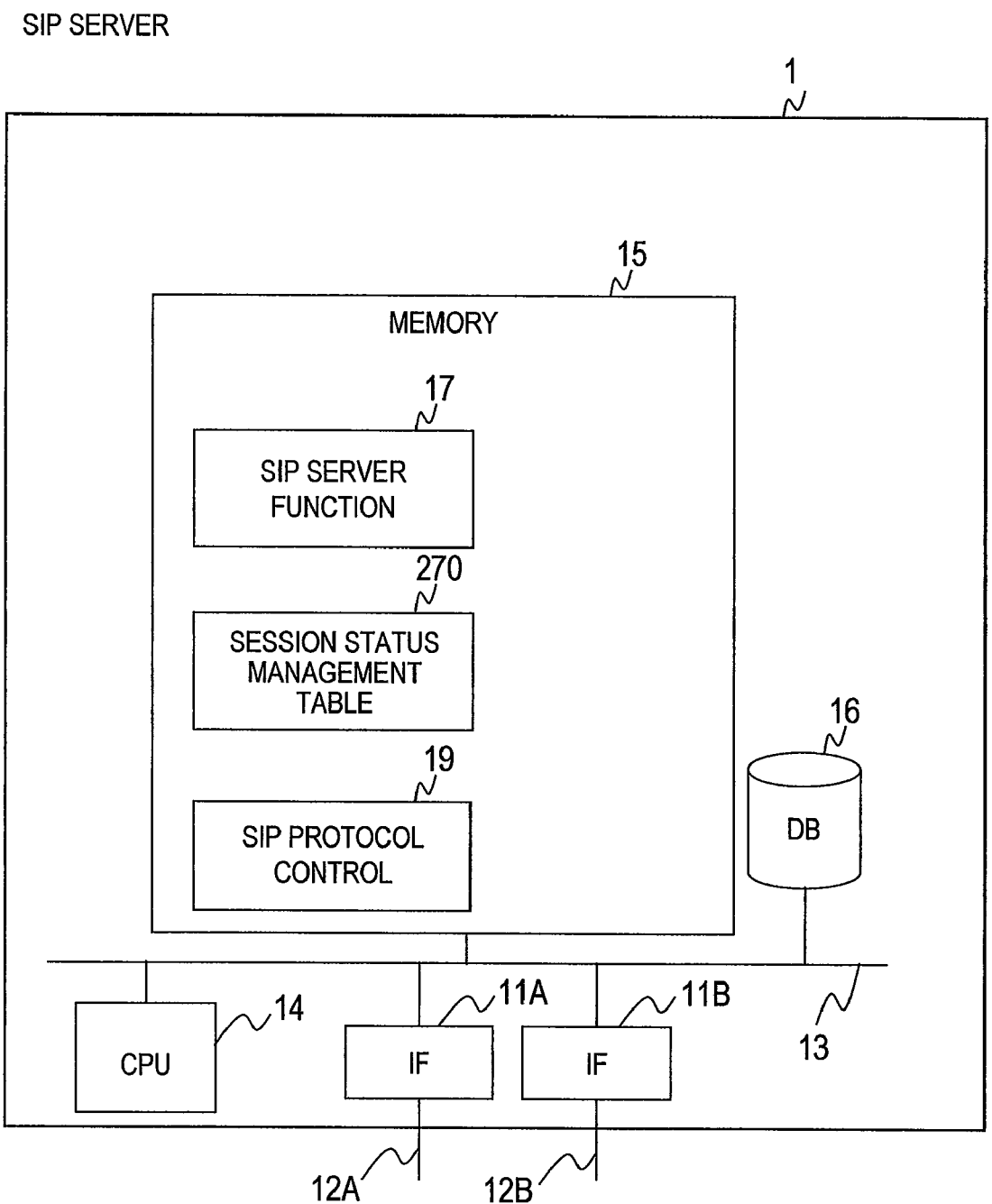
FIG. 6 is a block diagram for showing a configuration example of a SIP server according to the first embodiment of this invention.

FIG. 6 is a block diagram for showing a configuration example of the SIP server 1 according to the first embodiment of this invention.

The SIP server 1 includes interfaces (IFs) 11 (11A and 11B) which accommodate lines 12 (12A and 12B), a CPU 14, a memory 15 and a database (DB) 16. Each element is connected by a bus 13.

The memory 15 at least holds a SIP server function 17, a session status management table 270 and a SIP protocol control program 19 which executes protocol processing. Note that the memory 15 may store further additional programs.

The CPU 14 is a processor which executes the programs stored in the memory 15. In descriptions hereinafter, the processes the SIP server 1 execute are actually performed by the CPU 14 by executing any one of the programs stored in the memory 15.

FIG. 7 is an explanation diagram for showing a configuration example of a session status management table 270 stored in the SIP server 1 according to the first embodiment of this invention.

The SIP server 1 holds the session timer between the SIP application server 3 and the terminals 7.

The session status management table 270 at least includes association information of a To header 271, a From header 272, a call ID 273, a timer T 274 and status 275 which are all included in a SIP message.

The SIP server 1 holds the session status management table 270. Accordingly, the SIP server 1 is able to store the transmission period (the timer value) of transmitting/receiving a message for checking whether the communication between the SIP application server 3 and the terminals 7 is normally performed. Therefore, the termination of the communication session can be detected when the value of the timer T1 expires without receiving the message from the terminal 7A, for example. Note that in the first embodiment, the SIP application server 3 detects the termination of the communication session. The case of the SIP server 1 detecting the termination of the communication session will be described in a third embodiment.

Figure 8:
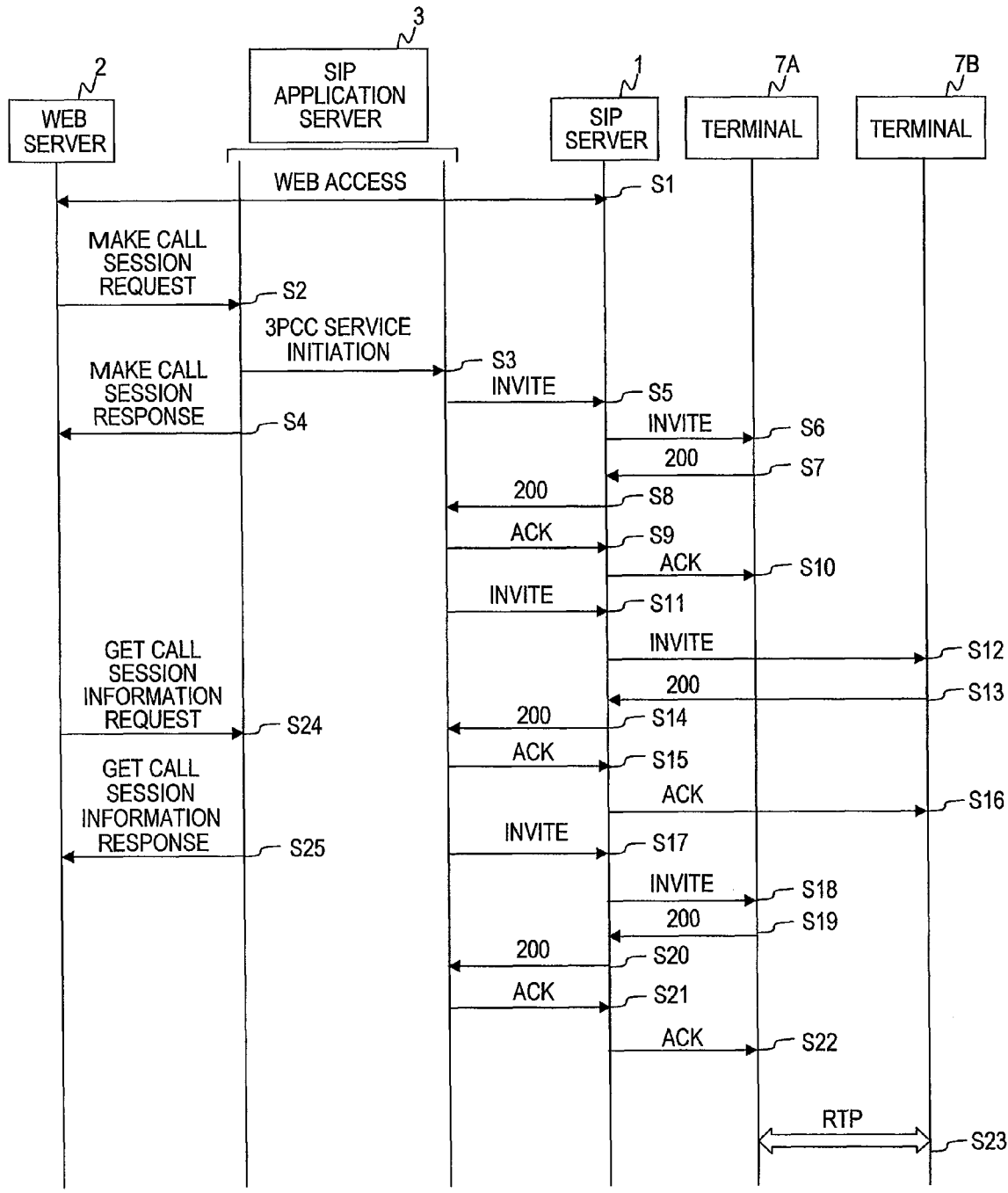
FIG. 8 is a sequence diagram for showing a process of initiating a general 3PCC service according to the first embodiment of this invention.

FIG. 8 is a sequence diagram for showing a process of initiating a general 3PCC service according to the first embodiment of this invention. The message transmitted/received between the Web server 2 and the SIP application server 3 is specified by the Parlay-X. Note that in FIG. 8, the SIP application server 3 is shown in two separate ways to make the operation inside the SIP application server 3 easier to understand. The subsequent sequence diagrams are shown in the similar way.

A message (for example, an HTTP message) is transmitted/received between the terminal 7A and the Web server 2. The message requesting for the initiation of the 3PCC service is transmitted from the Web server 2 to the terminal 7A (S1). The message includes an identifier of the terminal 7A and an identifier of a terminal (the terminal 7B for this case) of the connection destination. Note that the 3PCC service is provided by the 3PCC control module 3902, the SIP User Agent control module 3901 and the SIP protocol control module 3801.

The Web server 2 receiving the message transmits a message (make Call Session Request) for requesting the session initiation to the SIP application server 3 (S2). The message includes the identifier of the terminal 7A, the identifier of the terminal 7B and an identifier of the Web server 2.

The SIP application server 3 which received the message for requesting the session initiation initiates the 3PCC service (S3).

In addition, the SIP application server 3 generates an identifier for uniquely identifying the communication session between the Web server 2 and the SIP application server 3, and searches for an entry from the Parlay-X call Session Identifier 211 in the session information table 210 using the generated identifier as a search key. In a case where the searched entry is not found, the SIP application server 3 generates a new entry 210-1 and registers the generated identifier in the Parlay-X call Session Identifier 211 of the generated entry 210-1. In a case where the searched entry is found, the SIP application server 3 notifies the Web server 2 of an error.

Moreover, the SIP application server 3 registers the identifier of the Web server 2 included in the received message for requesting the session initiation in the Web server IP address 212 of the entry 210-1.

Furthermore, the SIP application server 3 generates an identifier for identifying a communication session connected through the 3PCC service and registers the generated identifier in the 3PCC identifier 213 of the entry 210-1.

The SIP application server 3 generates a new entry and transmits a response message (make Call Session Response) to the Web server 2 after registering each identifier in the generated entry (S4).

After initiating the 3PCC service, the SIP application server transmits/receives a message for initiating a communication session between the SIP server 1 and the terminal 7A (S5 to S10) and checks whether the terminal 7A is available to communicate. In addition, the SIP application server 3 transmits/receives a message for initiating a communication session between the SIP server 1 and the terminal 7B (S11 to S16) and checks if the terminal 7B is available to communicate.

In a case where the terminal 7A and the terminal 7B are both determined to be available to communicate, the SIP application server 3 transmits to terminal 7A media information necessary for communicating with the terminal 7B (S17 to S22). The communication between the terminal 7A and the terminal 7B is possible through the above-described processes (S23).

When the communication is possible, the SIP application server 3 determines a transmission period (T1 and T2) of a message (INVITE) for checking communication session status to the terminals 7. The message is for checking whether the communication session status of the terminals connected through the 3PCC service is normal. Moreover, the transmission period T1 is a transmission period (see FIG. 9) of a message for checking the communication session status between the SIP application server 3 and the terminal 7A. The transmission period T2 is a transmission period (see FIG. 9) of a message for checking the communication session status between the SIP application server 3 and the terminal 7B.

Figure 9:
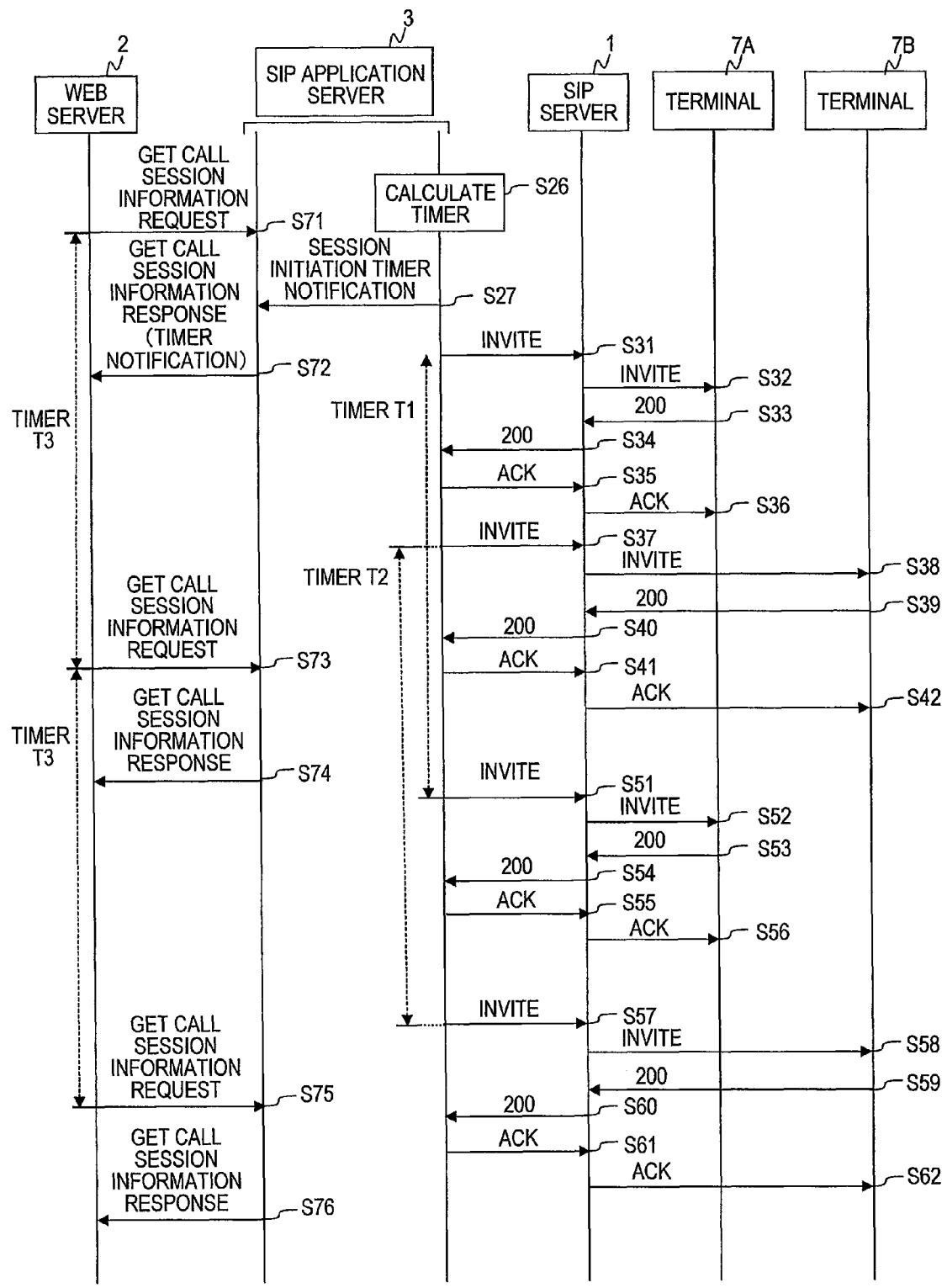
FIG. 9 is a sequence diagram for showing a process of checking communication session status performed when a 3PCC service is continued after initiating a communication session between terminals according to the first embodiment of this invention.

The transmission periods (T1 and T2) of the message for checking the communication session status are determined by using procedure specified in IETF RFC4028. The procedure specified in IETF RFC4028 makes possible periodical update of the communication session by using SIP INVITE or SIP UPDATE. FIG. 9 shows an example of a sequence diagram for the periodical update of the communication session by using the SIP INVITE.

More specifically, in a case where communication sessions are initiated between the terminals 7 and the SIP application server 3, the transmission periods (T1 and T2) of the message (INVITE) for checking the communication session status by transmitting/receiving the smallest value of the period and the like of updating the communication session. Note that the transmission periods T1 and T2 may have different values.

With the transmission periods of the transmission periods T1 and T2, whether the communication session status is normal can be checked by transmitting/receiving the SIP message between the SIP application server 3 and the terminal 7. Note that the message transmitted/received for periodically checking the communication session status is normal between the SIP application server 3 and the terminal 7 and may be often called a keep alive message.

After the transmission periods T1 and T2 are determined, the SIP application server 3 searches for an entry from the session information table 210 using the 3PCC identifier 213 as a search key, and sets the timer value T1 214 and the timer value T2 215 of the searched entry. Moreover, the SIP application server 3 sets "busy" in the status 216 of the searched entry.

The Web server 2 transmits a call information query request (get Call Session Information Request) for checking the communication session status to the SIP application server 3 (S71). The SIP application server 3 which received the call information query request transmits a response message (get Call Session Information Response) including the communication session status to the Web server 2 (S72). Accordingly, the Web server 2 can detect the communication session status.

The message specified by the Parlay X is transmitted in S71 and S72. In this embodiment, the message is transmitted at least once after the communication session is initiated between the terminals. Note that the message may be transmitted before the communication session is initiated.

FIG. 9 is a sequence diagram for showing a process of checking communication session status performed when the 3PCC service is continued after initiating the communication session between terminals according to the first embodiment of this invention.

S31 to S36 and S51 and S56 in FIG. 9 show transmission/reception of the message (keep alive message) for checking the communication session status of the terminal 7A. S37 to S42 and S57 to S62 in FIG. 9 show transmission/reception of the message (keep alive message) for checking the communication session status of the terminal 7B.

In addition, the timer T1 214 shows the transmission period (the interval between the S31 and S51) of the keep alive message between the SIP application server 3 and the terminal 7A. Similarly, the timer T2 (215) shows the transmission period (the interval between the S37 and S57) of the keep alive message between the SIP application server 3 and the terminal 7B. Note that the sequence (S31 to S62) shows a process generally performed when the 3PCC service monitors the communication session status.

The processes of S1 to S23 are the same as that of FIG. 8. However, information included in the message transmitted/received between the Web server 2 and the SIP application server 3 differ because the timer T3 217 of the session information table 210 and the timer 237 of the session information table 230 are added. The difference will be described.

After the timer T1 214 and the timer T2 215 are determined, the SIP application server 3 initiates the session timer notification routine 370 to obtain the timer T3 217 using the timer T1 214 and the timer T2 215 of the session information table 210 (S26). Hereinafter, the session timer notification routine 370 is described with reference to FIG. 10.

Figure 10:
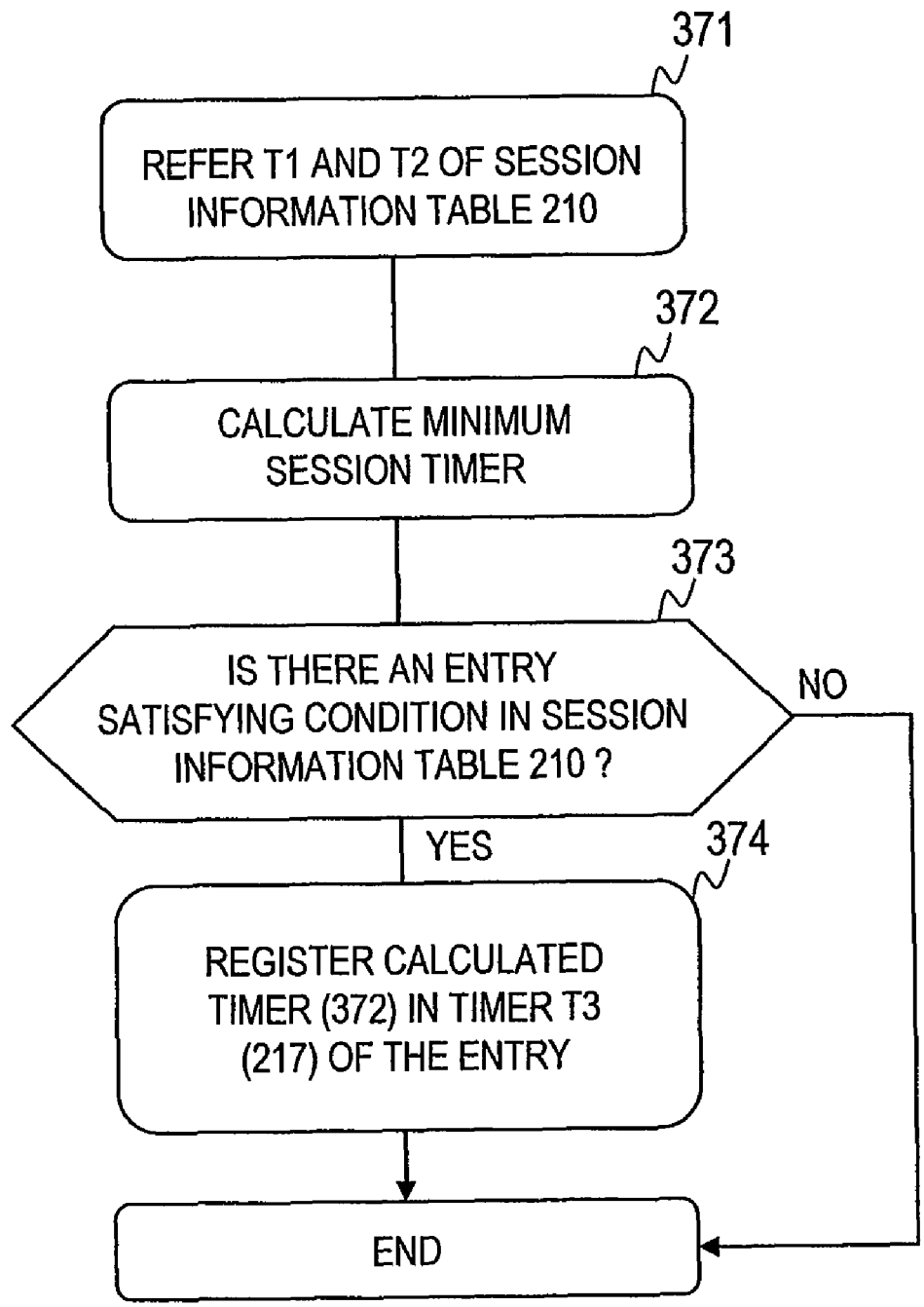
FIG. 10 is a flowchart of a session timer notification routine according to the first embodiment of this invention.

FIG. 10 is a flowchart of a session timer notification routine 370 according to the first embodiment of this invention.

The SIP application server 3 checks the timer T1 214 and the timer T2 215 of the session information table 210 (371) to obtain the session timer (372). More specifically, the SIP application server 3 compares the timer T1 214 and the timer T2 215 and determines a value smaller than the timer value as a session timer. Accordingly, the Web server 2 then is able to inquire of the SIP application server 3 about the communication session status based on the obtained session timer. Note that the obtained session timer is preferably a comparable value as the timers T1 and T2 so that communication load caused by the query request from the Web server 2 to the SIP application server 3 can be suppressed.

After the session time is obtained, the SIP application server 3 searches for an entry from the session information table 210 using the 3PCC identifier 213 as a search key (373). In a case where the searched entry is found, the SIP application server 3 registers the obtained session timer in the timer T3 217 of the searched entry (374 and S27) and ends the routine. In a case where the searched entry is not found, the SIP application server 3 ends the routine.

The sequence diagram is again described by returning to FIG. 9.

The Web server 2 transmits the call information query request (get Call Session Information Request) to the SIP application server 3 (S71). Note that S71 is the same one as the message transmitted in S24 in FIG. 8.

The SIP application server 3 which received the call information query request searches for a entry from the session information table 210 using the Parlay X call Session Identifier 211 included in the call information query request as a search key, and reads the status 216 and the timer T3 217 from the searched entry.

In a case where the timer T3 217 is not set to the searched entry, the SIP application server 3 transmits the response message (get Call Session Information Response) including the communication session status to the Web server 2 (S72).

In a case where the timer T3 217 is set to the searched entry, the SIP application server 3 transmits the response message (get Call Session Information Response) including the read communication session status and the timer T3 217 to the Web server 2 (S72).

In a case where the Web server 2 receives the response message, the Web server 2 searches for an entry from the session information table 230 using the Parlay X call Session Identifier 231 included in the response message as a search key, and reads the searched entry. In a case where the searched entry is not found, the Web server 2 generates a new entry and registers the Parlay X Session Identifier 231, the SIP AS IP address 234, the 3PCC identifier 235, and the timer 237 based on the communication session status and the timer T3 217 included in the received response message. In a case where the searched entry is found, the Web server 2 registers the timer T3 217 included in the received response message in the timer 237 of the searched entry.

With the above-described processes, the Web server 2 is able to periodically transmit the call information query request (get Call Session Information Request) to the SIP application server 3 based on the value registered in the timer 237. Consequently, the Web server 2 can quickly detect communication errors such as termination of the communication session.

Figure 11:
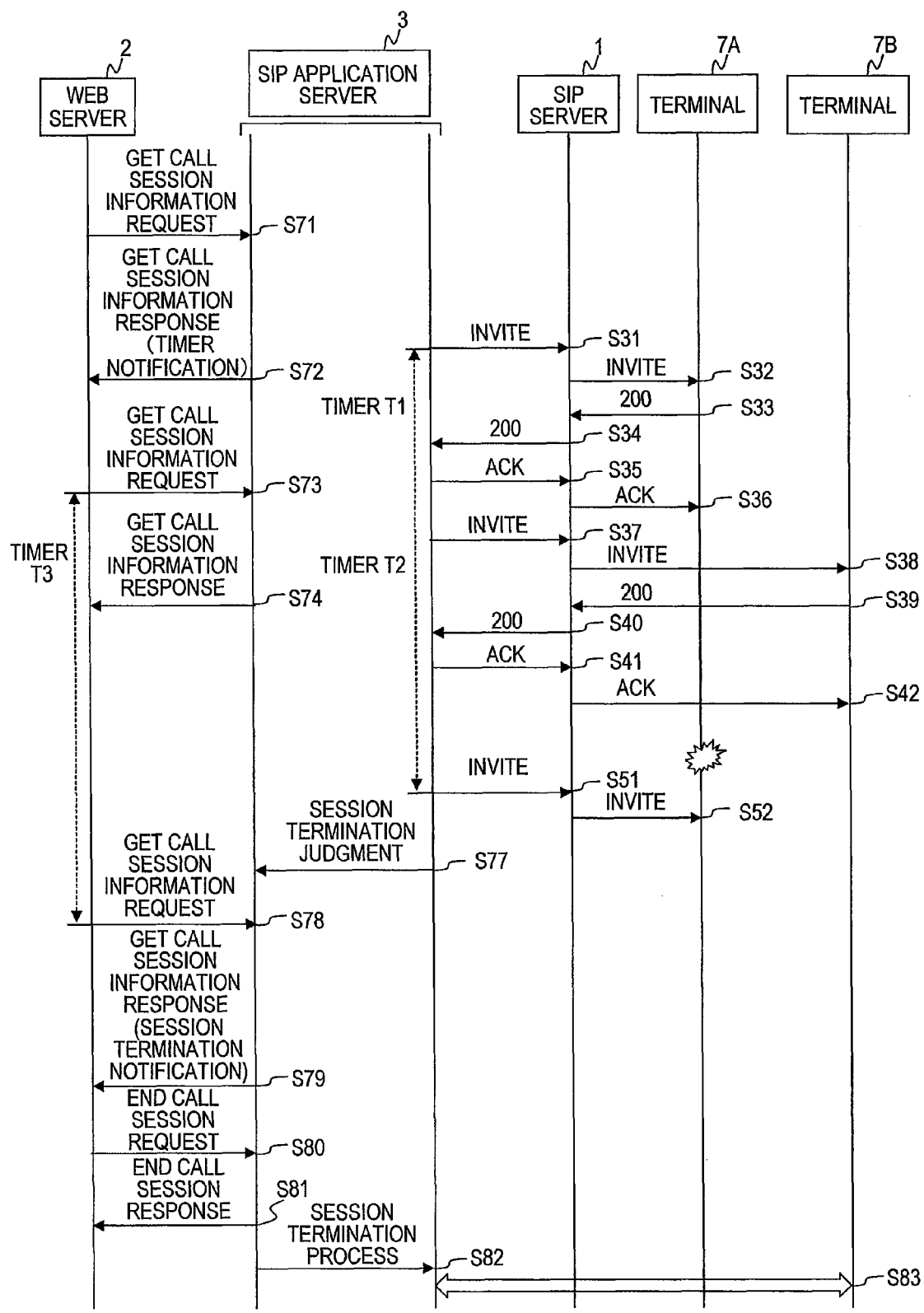
FIG. 11 is a sequence diagram for showing a process when an error occurs during the initiation of the 3PCC service according to the first embodiment of this invention.

FIG. 11 is a sequence diagram for showing a process when an error occurs during the initiation of the 3PCC service according to the first embodiment of this invention.

The initiation process of the 3PCC service and the check process of the communication session status performed when the 3PCC service is continued are similar to those of FIGS. 8 and 9. Here, it is assumed that the communication session of the terminal 7A is terminated with some reason.

The SIP application server 3 is not able to receive the keep alive message transmitted/received in the period (T1) between the SIP application server 3 and the terminal 7A. Consequently, the SIP application server 3 determines the communication session status as terminated because the SIP application server 3 did not receive a response to the message (INVITE) (S51 and S52) for a certain period of time. The SIP application server 3 searches for an entry from the session information table 210 using the 3PCC identifier 213 as a search key and updates the status 216 of the searched entry to "terminated" (S77).

The Web server 2 transmits the call information query request (get Call Session Information Request) in a period of the timer 237 to the SIP application server 3 (S78).

The SIP application server 3 which received the call information query request searches for an entry from the session information table 210 using the Parlay X call Session Identifier 211 included in the call information query request as a search key and reads the status 216 and the timer T3 217 from the searched entry. The SIP application server 3 transmits a response message (get Call Session Information Response) including the status 216 ("terminated" for this case) and the timer T3 217 to the Web server 2 (S79).

The Web server 2 which received the response message including the status 216 ("terminated" for this case) checks the status 216 ("terminated") included in the response message. In this case, the Web server 2 determines that the communication session is terminated because the status 216 is "terminated". The Web server 2 transmits a request (end Call Session Request) for terminating the 3PCC service to the SIP application server 3.

The SIP application server 3 which received the request for terminating the 3PCC service transmits a response message (end Call Session Response) to the Web server 2 (S81) and performs the termination process of the communication session (S82 and S83). Moreover, the SIP application server 3 deletes the entry of status 216 being "terminated" from the session information table 210 after an expiration of a certain time from the termination process of the communication session.

The Web server 2 periodically transmits a call status query request to the SIP application server 3 using the timer value (the T3 in this embodiment) notified by the SIP application server 3. Accordingly, the Web server 2 is able to quickly detect a failure of the communication session.

Next, a second embodiment is described with reference to the drawings. In the first embodiment, the SIP application server 3 notified a timer value which is a period inquiring the communication session status. Meanwhile, in the second embodiment, a Web server 2 requests a SIP application server 3 for the communication session status.

The Web server 2 requests the communication session status. Accordingly, the SIP application server 3 is able to notify the Web server 2 that the communication session status between terminals is being "terminated".

A communication network in the second embodiment is same as that of the first embodiment. Accordingly, the description is omitted (see FIG. 1). Hereinafter, only differences between the first and the second embodiments are described.

Figure 12:
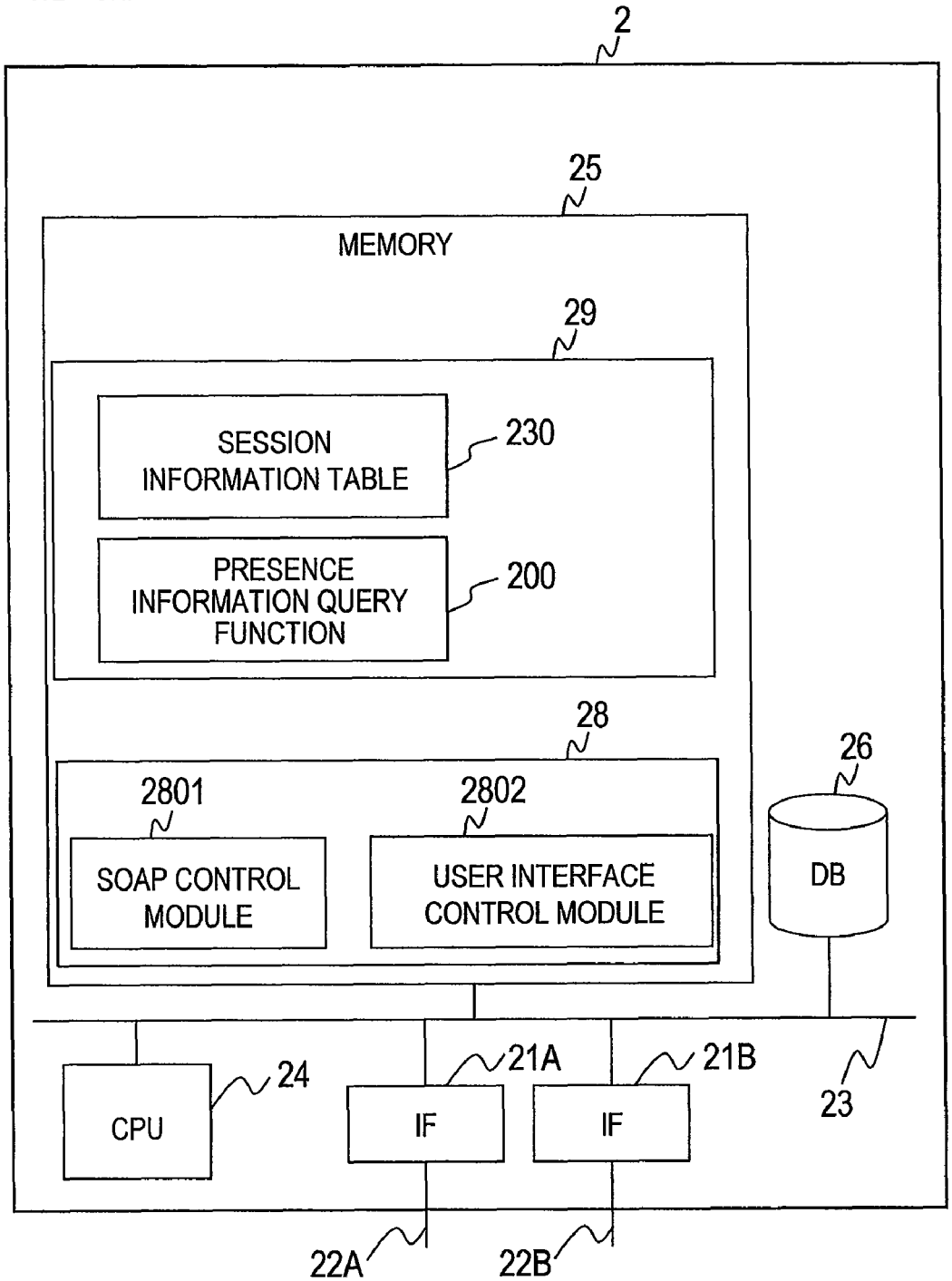
FIG. 12 is a configuration diagram of a Web server according to a second embodiment of this invention.

FIG. 12 is a configuration diagram of the Web server 2 according to the second embodiment of this invention In the second embodiment, a memory 25 includes a processing program 200 for inquiring presence information, instead of the timer reception processing program 27.

The Web server 2 includes the presence information query function 200. Accordingly, the Web server 2 is able to request the SIP application server 3 for notification of the presence information. Note that in the second embodiment, the presence information query function 200 is initiated after the initiation of a 3PCC service.

Figure 13:
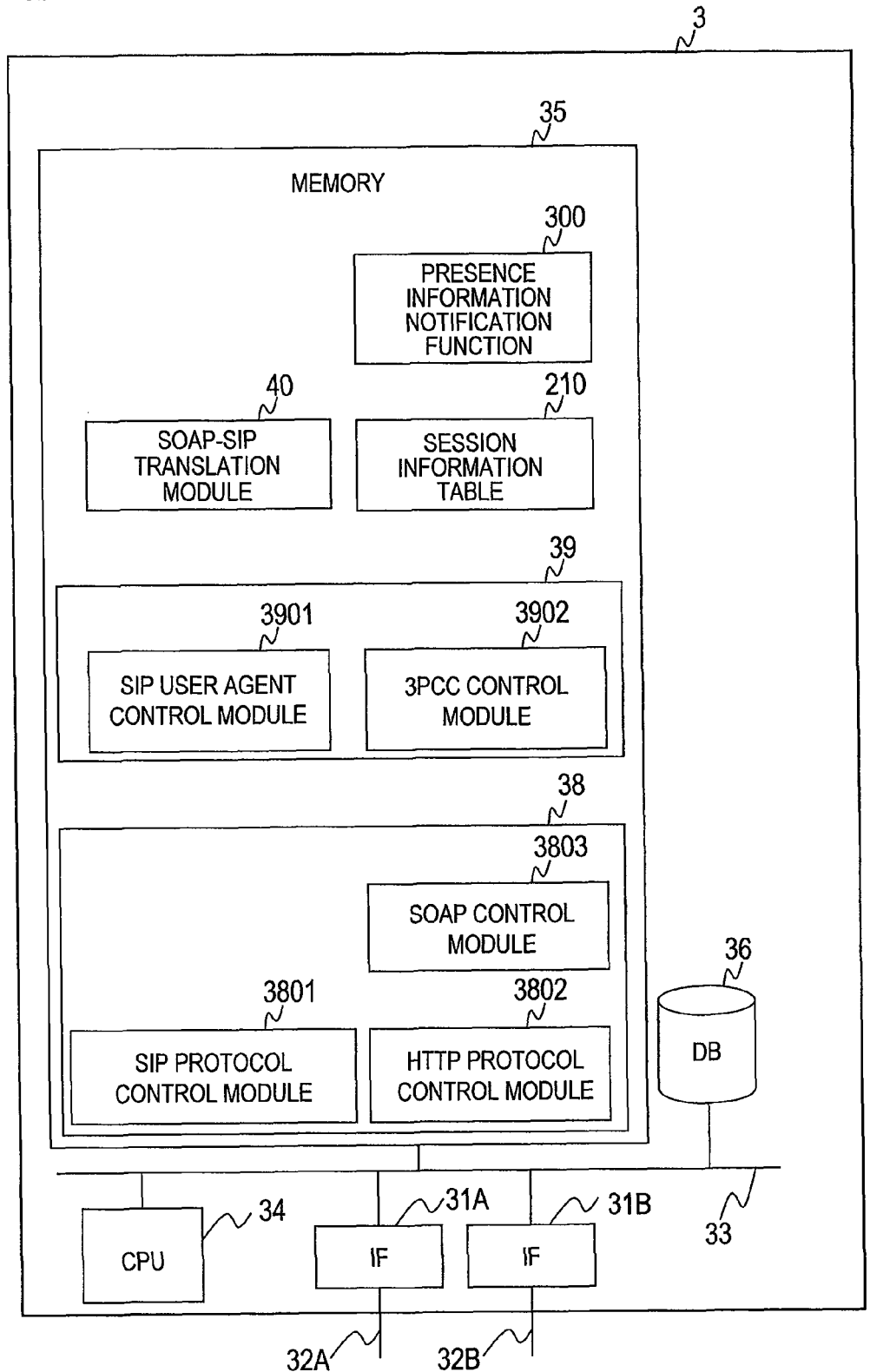
FIG. 13 is a configuration diagram of a SIP application server according to the second embodiment of this invention.

FIG. 13 is a configuration diagram of the SIP application server 3 according to the second embodiment of this invention.

In the second embodiment, a memory 35 includes a processing program 300 for performing presence information notification, instead of the session timer notification routine 370.

The SIP application server 3 includes the presence information notification function 300. Accordingly, the SIP application server 3 is able to notify the Web server 2 of the presence information to which the communication session status is added.

FIG. 14 is an explanation diagram for showing a configuration example of a session information table 210 in the SIP application server 3 according to the second embodiment of this invention.

The session information table 210 includes a monitor 218 showing whether the SIP application server 3 is monitoring communication session status, instead of the timer T3 217. Note that in a case where the monitor 218 is set to be "on" and the communication session status is changed to "terminated" from "busy", the SIP application server 3 notifies the Web server of termination of the communication session using the presence information notification function 300.

Next, a 3PCC service initiation sequence in the second embodiment is described with reference to FIGS. 15 and 16. Hereinafter, among the procedures shown in FIGS. 15 and 16, the description of the same procedures as those of shown in FIGS. 8, 9 and 11 are omitted.

Figure 15:
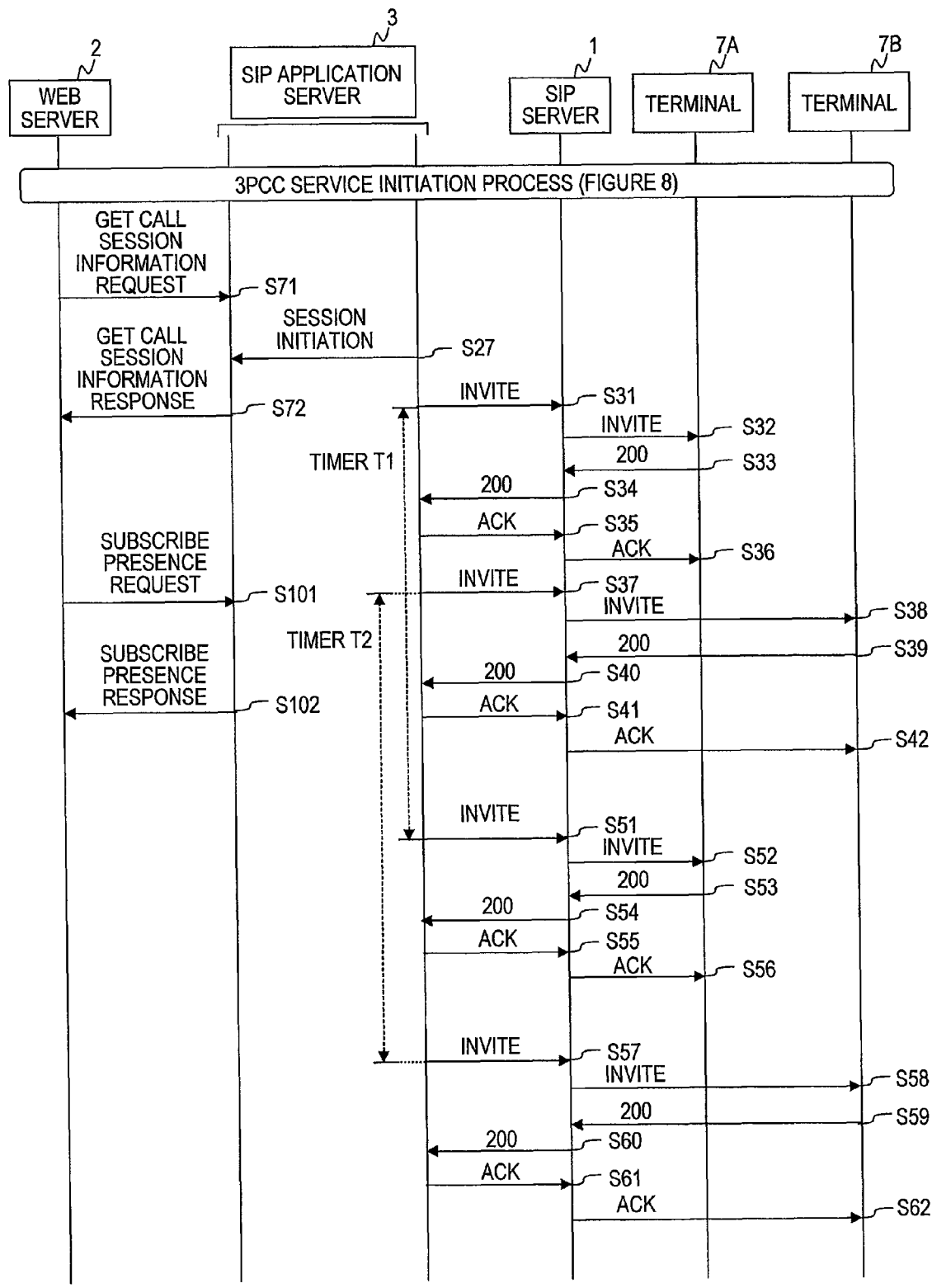
FIG. 15 is a sequence diagram for showing a process of checking communication session status performed when the 3PCC service is continued after initiating the 3PCC service according to the second embodiment of this invention.

FIG. 15 is a sequence diagram for showing a process of checking communication session status performed when the 3PCC service is continued after initiating the 3PCC service according to the second embodiment of this invention.

The Web server 2 transmits the call information query request (get Call Session Information Request) for checking the communication session status to the SIP application server 3 (S71).

The SIP application server 3 which received the call information query request searches for an entry from the session information table 210 using the Parlay X call Session Identifier 211 included in the call information query request as a search key, and reads the status 216 from the searched entry. The SIP application server 3 transmits a response message (get Call Session Information Response) including the status 216 to the Web server 2 (S72).

Note that the processes of S71, S27, S72 and S31 to S62 are same as those of the first embodiment. A message (keep alive message) for checking the communication session status between the SIP application server 3 and a terminal 7A is transmitted/received at the period of the timer T1. A message (keep alive message) for checking the communication session status between the SIP application server 3 and a terminal 7B is transmitted/received at the period of the timer T2.

The Web server 2 which received a response message (S72) checks that the status 216 included in the response message is "busy" and transmits a request (subscribe Presence Request) for notifying the communication session status to the SIP application server 3 (S101).

The SIP application server 3 which received the request searches for an entry from the session information table 210 using the Parlay X call Session Identifier 211 as a search key. The SIP application server 3 transmits the response message (subscribe Presence Response) to the Web server 2 after updating the monitor status 218 of the searched entry to "on" (S102).

Figure 16:
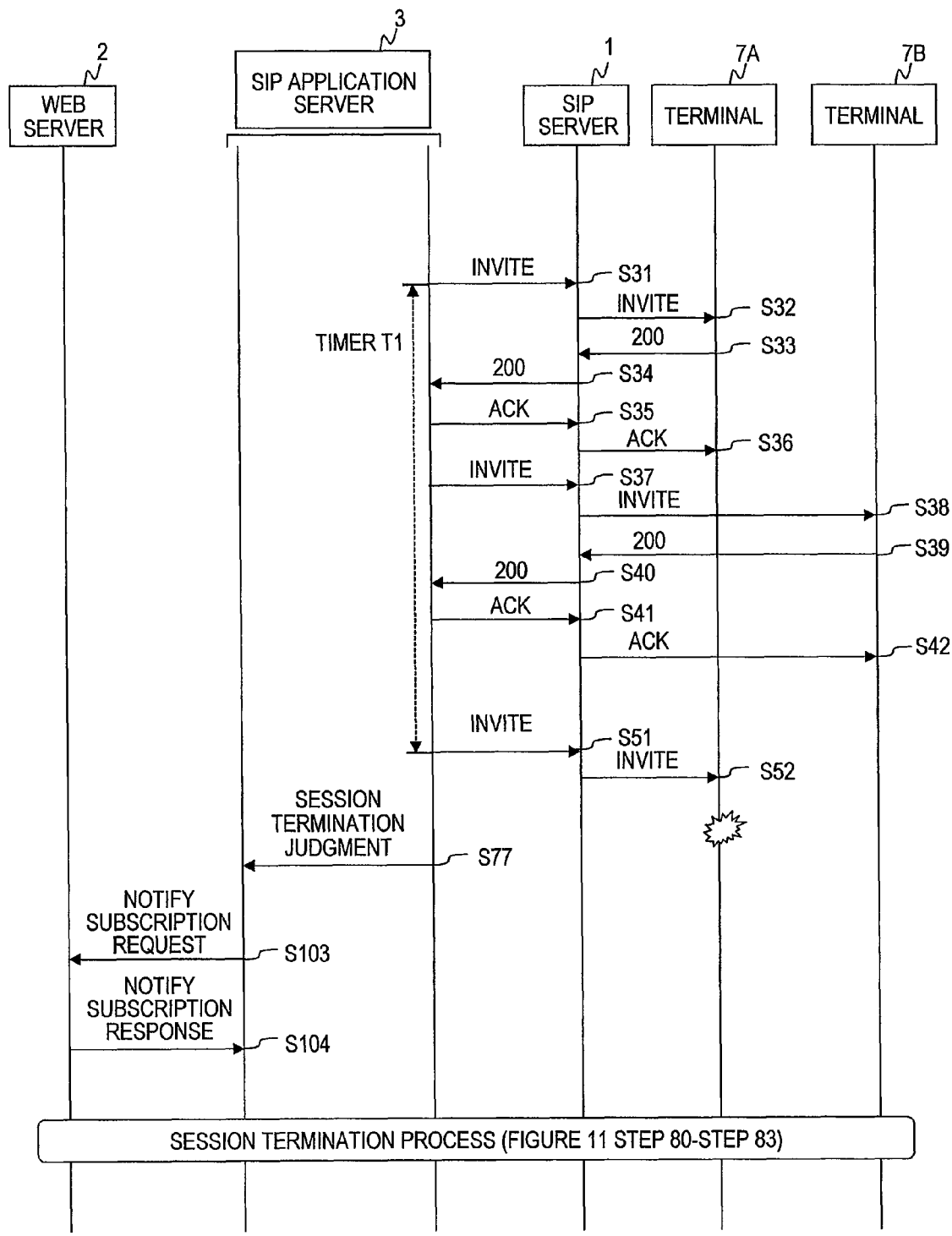
FIG. 16 is a sequence diagram for showing a process when an error occurs during the initiation of the 3PCC service according to the second embodiment of this invention.

FIG. 16 is a sequence diagram for showing a process when an error occurs during the initiation of the 3PCC service according to the second embodiment of this invention.

The processes of S31 to S52 and S77 are same as those of the first embodiment. Here, it is assumed that an error is occurred in the terminal A.

In S77, the SIP application server 3 searches for an entry from the session information table 210 using the 3PCC identifier 213 as a search key because the keep alive message is not received. The SIP application server 3 updates the status 216 of the searched entry to "terminated". Moreover, the monitor 218 of the searched entry is checked. In a case where the monitor 218 of the searched entry is "on", the SIP application server 3 transmits the Web server 2 of the message (notify Subscription Request) for notifying that the communication session is terminated (S103).

The Web server 2 which received the message transmits the response message (notify Subscription Response) including a request for terminating the 3PCC service to the SIP application server 3 (S104). Then a session termination process is performed (see S80 to S83 in FIG. 11).

According to the second embodiment, the SIP application server 3 can quickly detect the change in the status 216 of the session information table 210 from "busy" to "terminated" because the Web server 2 includes the presence information query function 200. In addition, the SIP application server 3 determines that the communication session is terminated and notifies the Web server 2 of the termination of the communication session. Consequently, the Web server 2 can quickly detect the termination of the communication session.

Next, a third embodiment of this invention is described with reference to the drawings.

Figure 17:
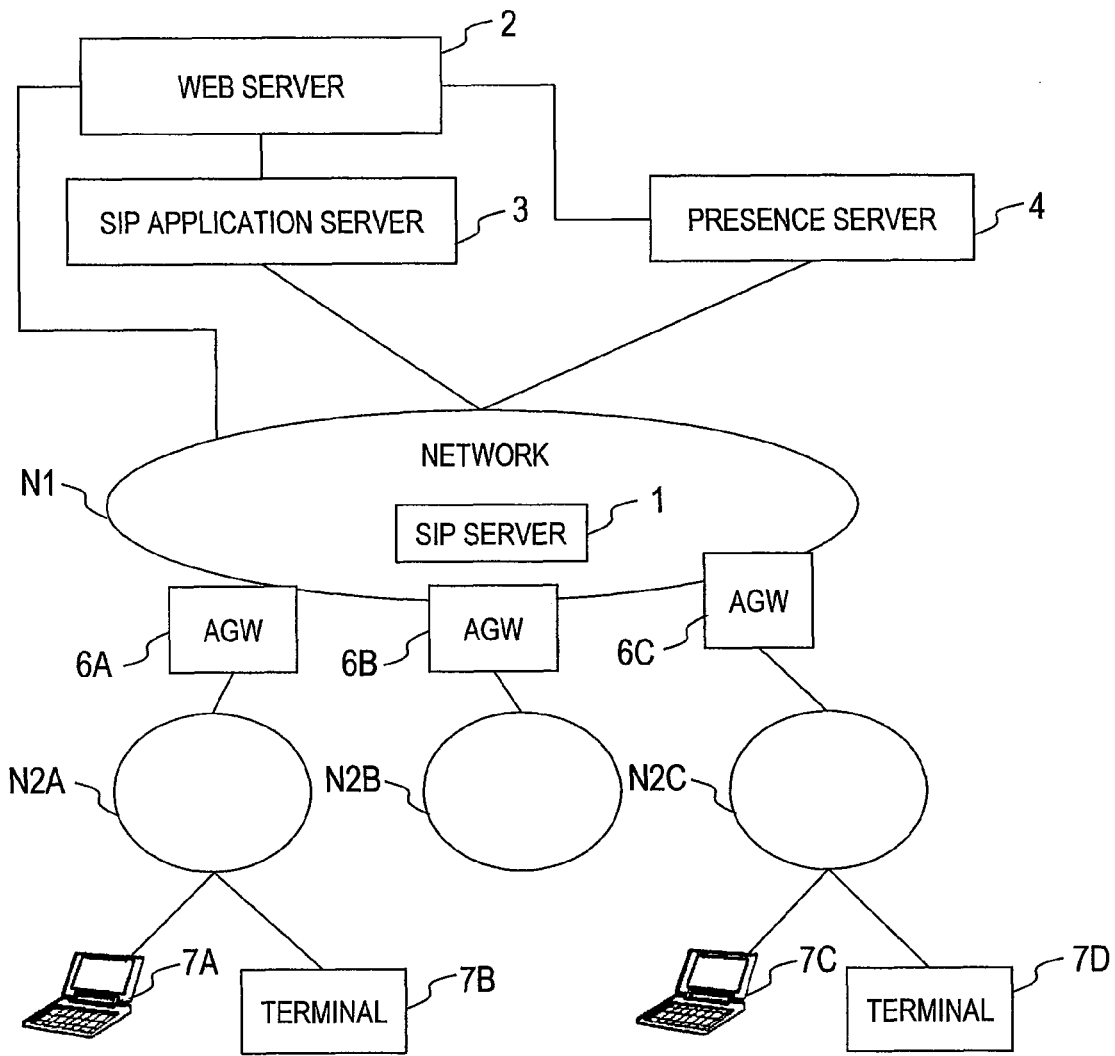
FIG. 17 is a configuration diagram of a communication network according to a third embodiment of this invention.

FIG. 17 is a configuration diagram of a communication network according to a third embodiment of this invention.

In the third embodiment, a presence server 4 is connected to a network N1. Moreover, in the third embodiment, the presence server 4 at least includes a watcher function. The watcher function is a function for monitoring status of specified terminals.

Figure 18:
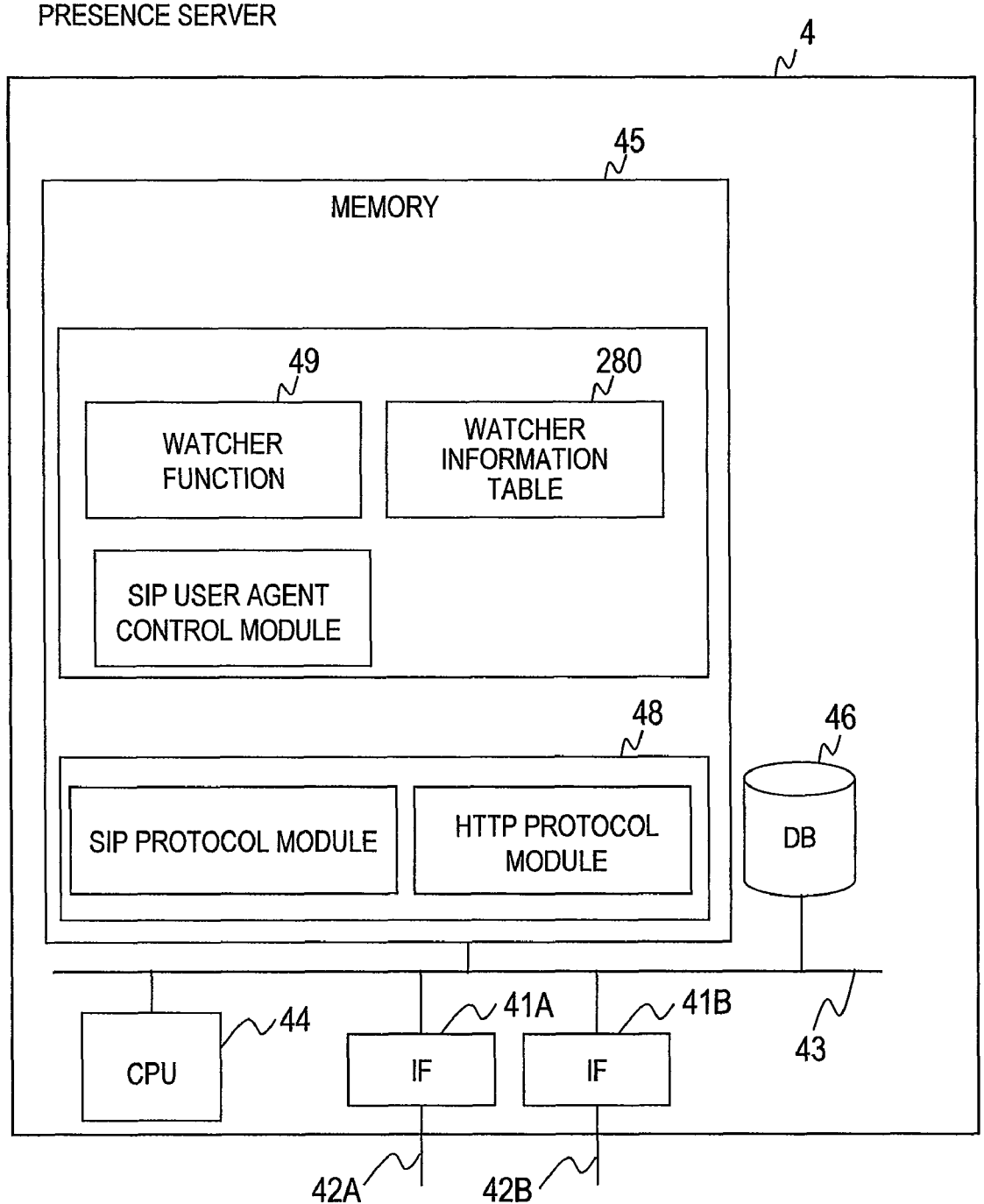
FIG. 18 is a block diagram for showing a configuration example of a presence server according to the third embodiment of this invention.

FIG. 18 is a block diagram for showing a configuration example of the presence server 4 according to the third embodiment of this invention.

The presence server 4 comprises interfaces (IFs) 41 (41A and 41B) which accommodate lines 42 (42A and 42B), a CPU 44, a memory 45 and a database (DB) 46. Each element is connected by a bus 43.

The CPU 44 is a processor for executing programs stored in the memory 45. The memory 45 stores a program for performing presence notification (not shown), a processing program necessary for storing presence information (a watcher function 49, for example) and a table (a watcher information table 280).

FIG. 19 is an explanation diagram for showing a configuration example of the watcher information table 280 in the presence server 4 according to the third embodiment of this invention.

The watcher information table 280 at least includes association information of presentity 281, a watcher 282 and status 283. The presentity shows an entity providing the presence information.

The presence server 4 includes the watcher information table 280. Accordingly, the presence server 4 can detect the communication session status of terminals. Consequently, the presence server 4 can determine that the communication session is terminated and notify the Web server 2 of the termination of the communication session. Hereinafter, only differences between the second and the third embodiments are described.

Figure 20:
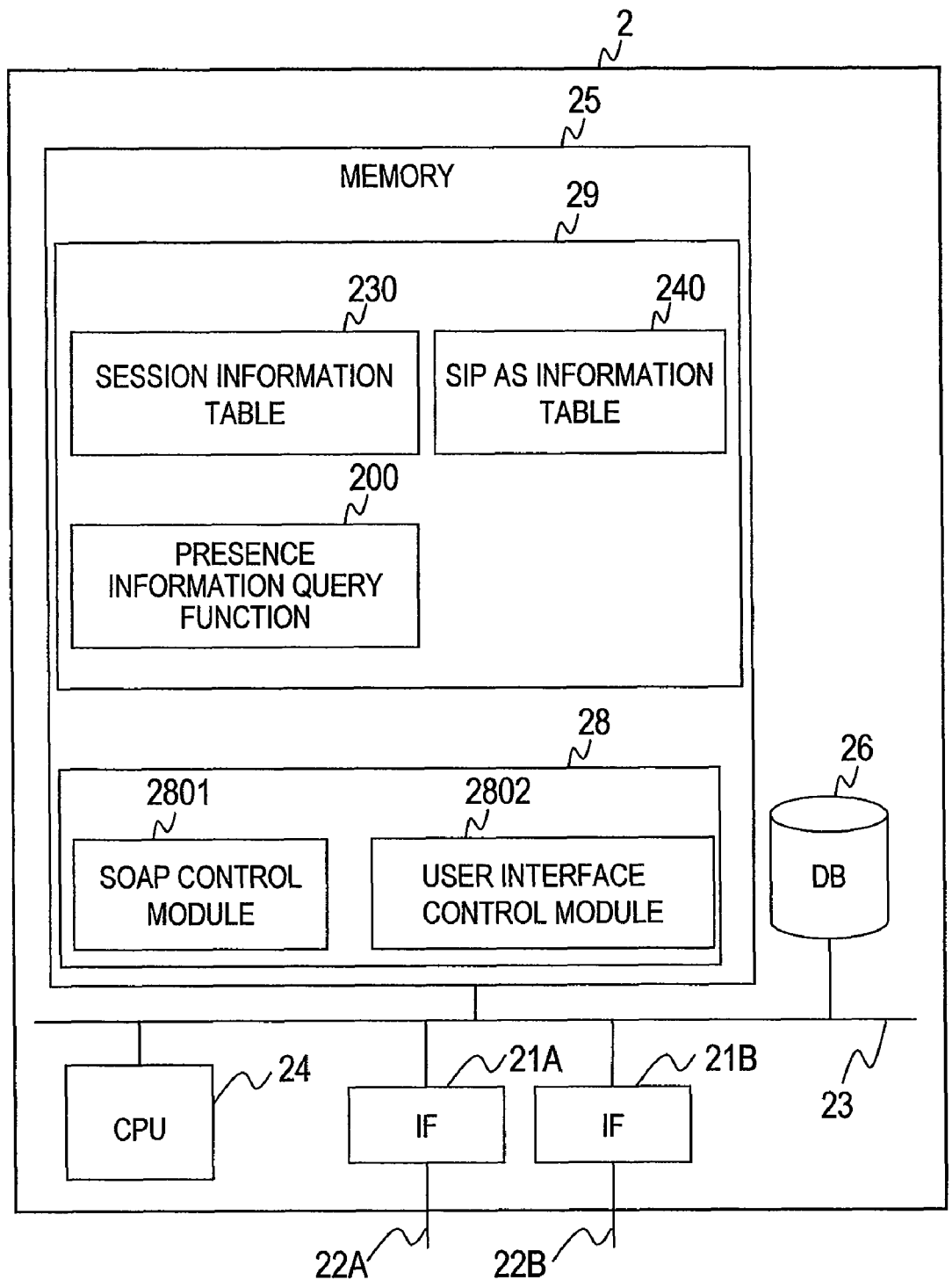
FIG. 20 is a block diagram for showing a configuration example of a Web server according to the third embodiment of this invention.

FIG. 20 is a block diagram for showing a configuration example of the Web server 2 according to the third embodiment of this invention.

In the third embodiment, a memory 25 includes a SIP AS information table 240.

Figure 21:
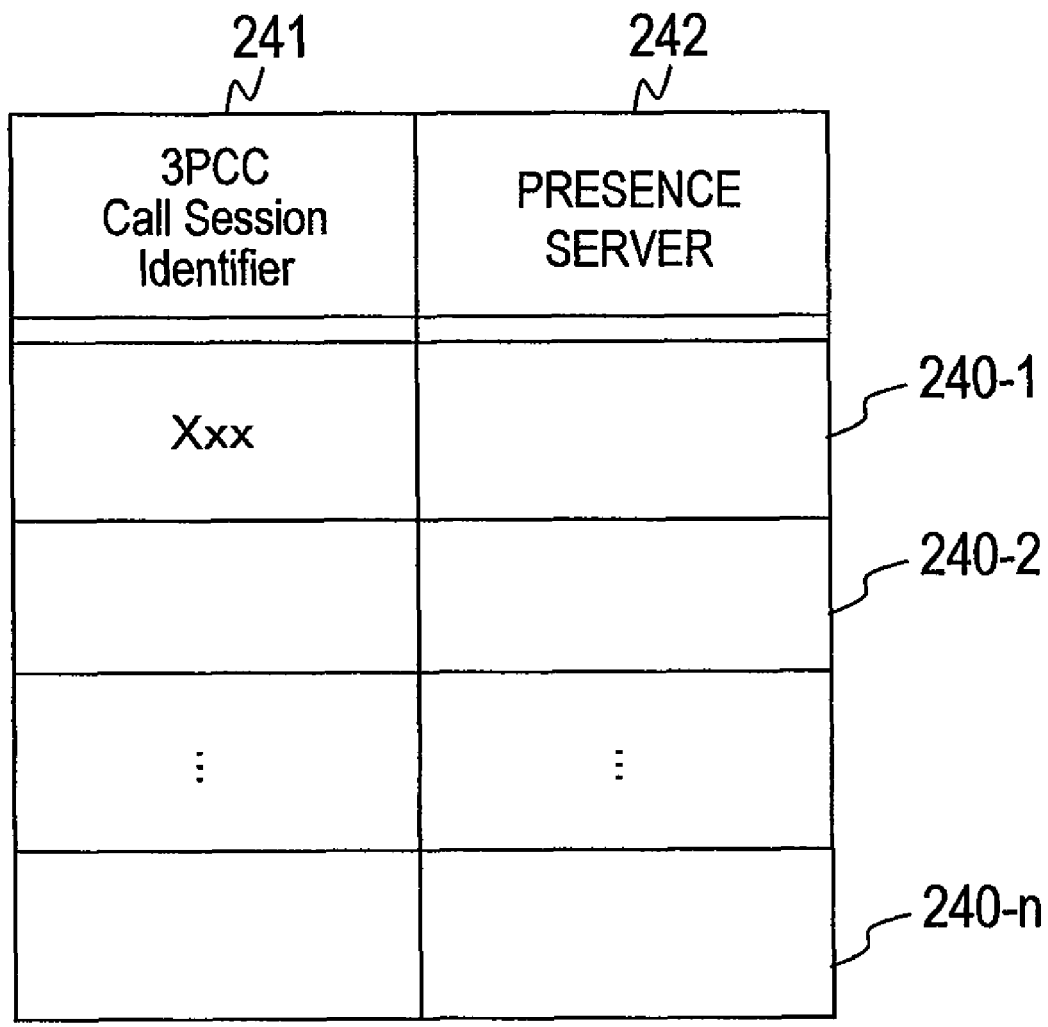
FIG. 21 is an explanation diagram for showing a configuration example of a SIP AS information table in the Web server according to the third embodiment of this invention.

FIG. 21 is an explanation diagram for showing a configuration example of the SIP AS information table 240 in the Web server 2 according to the third embodiment of this invention.

The SIP AS information table 240 includes information on a 3PCC call Session Identifier 241 and a presence server 242 which corresponds to the 3PCC call Session Identifier 241. Accordingly, the Web server 2 can obtain information on which communication session the presence server 4 holds.

The Web server 2 includes the SIP AS information table 240. Accordingly, the Web server 2 can associate the status of the presence server 4 with the 3PCC session. Consequently, the Web server 2 can obtain the communication session status based on the information transmitted from the presence server 4.

Next, a sequence when an error occurs at the initiation of the 3PCC service in the third embodiment is described with reference to FIGS. 22 and 23. Hereinafter, among the procedures shown in FIGS. 22 and 23, the description of the same procedures as those of shown in FIGS. 8, 9 and 11 are omitted.

Figure 22:
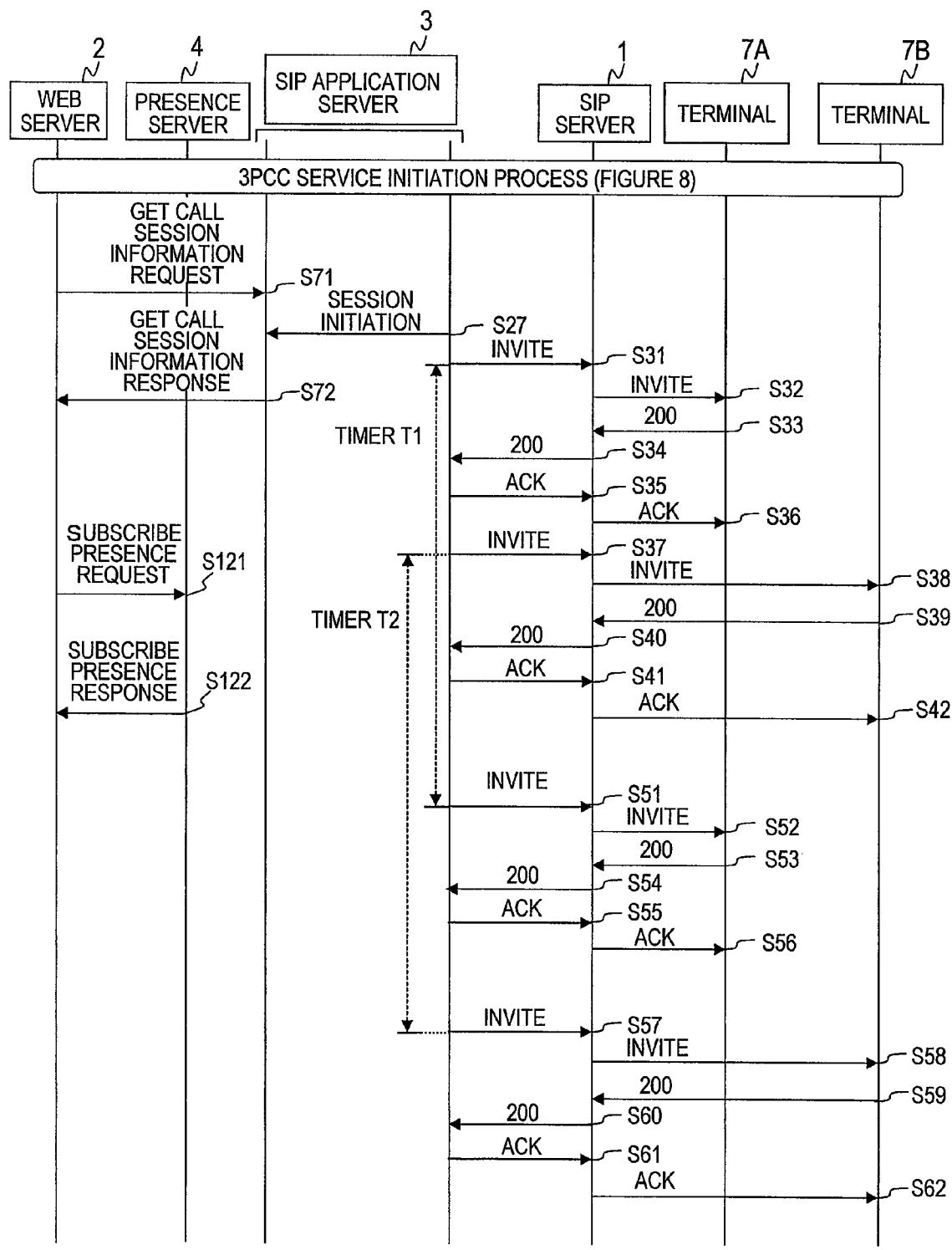
FIG. 22 is a sequence diagram for showing a process of checking communication session status performed when the 3PCC service is continued after initiating the 3PCC service and a process when an error occurs during the initiation of the 3PCC service according to the third embodiment of this invention.
Figure 23:
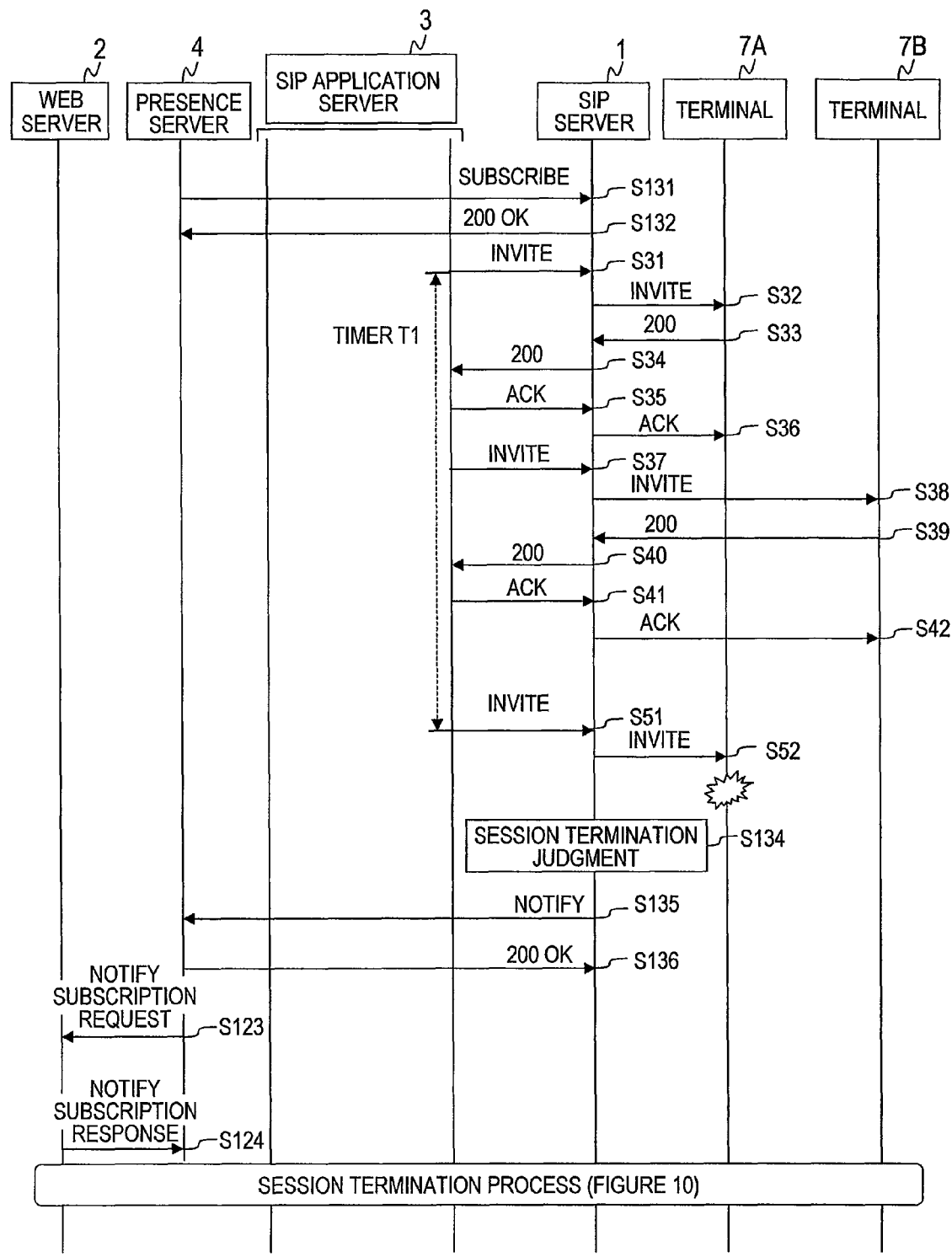
FIG. 23 is a sequence diagram for showing a process of checking communication session status performed when the 3PCC service is continued after initiating the 3PCC service and a process when an error occurs during the initiation of the 3PCC service according to the third embodiment of this invention.

FIGS. 22 and 23 are sequence diagrams for showing a process of checking status of a communication session performed when the 3PCC service is continued after initiating the 3PCC service, and a process when an error occurs during the initiation of the 3PCC service according to the third embodiment of this invention.

The Web server 2 transmits a request (subscribe Presence Request) for notifying communication session status to the presence server 4 (S121) when the Web server 2 finds the communication session status "busy" (S72). Here, the Web server 2 searches for an entry from the SIP AS information table 240 using the 3PCC call Session Identifier 241 as a search key. In a case where the searched entry is not found, the Web server 2 generates a new entry and registers an identifier of the presence server 4. In a case where the searched entry is found, the Web server 2 updates the information on the searched entry.

The presence server 4 which received the request transmits a response (subscribe Presence Response) to the request to the Web server 2 (S122).

Subsequently, the presence server 4 transmits a request (SUBSCRIBE) for notifying presence information including communication session status, a terminal 7A and a terminal 7B to a SIP server 1 (S131). The SIP server 1 which received the notification request for the presence information transmits a response (200 OK) to the notification request for the presence information (S132).

Here, it is assumed that the SIP server 1 detects termination of the communication session of, for example, the terminal 7A by the keep alive message (S134). In this case, the SIP server 1 notifies the presence server 4 of the presence information (NOTIFY) including the termination of the communication session of the terminal 7A (S135).

The presence server 4 which received the notification transmits a response to the notification of the presence information to the SIP server 1 (200, S136). The presence server 4 transmits a notification message (notify Subscription Request) including the presence information of the terminal 7A to the Web server 2 (S123).

The Web server 2 performs session termination after transmitting the response (notify Subscription Response) to the notification message to the presence server 4 (S124).

According to the third embodiment, the Web server 2 associates the presence server 4 with an identifier of the communication session during initiation. Accordingly, the Web server 2 can manage the associated presence server 4 and the identifier of the communication session during initiation. Consequently, the Web server 2 can quickly detect the change in the communication session status from "busy" to "terminated".

In addition, load on the SIP application server 3 can be reduced by comprising the presence server 4 as compared to the second embodiment. Moreover, costs can be reduced using the current presence server without adding a new presence notification function to the SIP application server 3.

While the present invention has been described in detail and pictorially in the accompanying drawings, the present invention is not limited to such detail but covers various obvious modifications and equivalent arrangements, which fall within the purview of the appended claims.

What is claimed is:

1. A communication system comprising:
   a session control server for controlling communication sessions between a plurality of terminals and an application server;
   the application server for performing third party call control (3PCC) and communicating with the session control server;
   a web server for communicating with the application server; and
   a network for coupling the session control server, the application server and the web server,
   wherein the application server periodically detects information of a communication session status between each of the plurality of terminals and the application server, detect termination or failure of any communication session between the plurality of terminals and the application server based on the detected information, and transmit status related information including information of any such detected termination or failure of any communication session to the web server,
   wherein the web server detects the communication session status between each of the plurality of terminals and the application server based on the received status related information, and, when the received status related information includes a detected termination or failure of any communication session that has not yet been terminated by the web server, transmit a request for terminating a 3PCC service related to the terminated or failed communication session to the application server,
   wherein the application server:
      refers to periods of detecting the information on the communication session status between each of the plurality of terminals and the application server in a case where a call control time period is controlled based on the status related information;
      determines a value smaller than a smallest period among the checked periods as the call control time period; and
      transmits the status related information including the determined call control time period to the web server, and
   wherein the web server further controls the call control time period based on the determined call control time period included in the received status related information.

2. The communication system according to claim 1, wherein the status related information is included in a SIP message, and wherein the call control time period is a session timer.

3. The communication system according to claim 1, wherein the session control server is configured to:
   detect termination or failure of the any communication session status between each of the plurality of terminals and the application server; and
   add the detected termination or failure to the status related information.

4. The communication system according to claim 1, further comprising a presence server coupled to the network,
   wherein the web server is further configured to transmit a request for detecting the communication session status between each of the plurality of terminals and the application server to the presence server, and
   wherein the presence server is configured to:
   detect the communication session status between each of the plurality of terminals and the application server according to the request; and
   transmit presence information including the detected communication session status between each of the plurality of terminals and the application server to the web server.

5. The communication system according to claim 4,
   wherein the presence server is further configured to transmit the request to the session control server in a case where the communication session status between each of the plurality of terminals and the application server is detected according to the request, and
   wherein the session control server is further configured to detect the communication session status between each of the plurality of terminals and the application server periodically according to the request.

6. The communication system according to claim 4,
   wherein the session control server is further configured to:
   detect termination or failure of any communication session between the plurality of terminals and the application server according to the request; and
   transmit the status related information including the termination or failure of any communication session to the presence server,
   wherein the presence server is further configured to transmit presence information including the termination or failure of the any communication session based on the status related information to the web server.

7. The communication system according to Claim 1, web server is further configured to transmit a request for detecting the communication session status between each of the plurality of terminals and the application server to the application server.

* * * * *